(12) United States Patent
Tomigashi

(10) Patent No.: US 8,159,161 B2
(45) Date of Patent: Apr. 17, 2012

(54) MOTOR CONTROL DEVICE

(75) Inventor: Yoshio Tomigashi, Osaka (JP)

(73) Assignee: Sanyo Electric Co., Ltd. (JP)

( * ) Notice: Subject to any disclaimer, the term of this patent is extended or adjusted under 35 U.S.C. 154(b) by 338 days.

(21) Appl. No.: 12/543,802

(22) Filed: Aug. 19, 2009

(65) Prior Publication Data

US 2010/0045218 A1 Feb. 25, 2010

(30) Foreign Application Priority Data

Aug. 20, 2008 (JP) ................ 2008-211893

(51) Int. Cl.
*H02P 21/04* (2006.01)

(52) U.S. Cl. ......... 318/400.02; 318/400.33; 318/400.01; 318/700; 318/400.32

(58) Field of Classification Search ............. 318/400.02, 318/400.01, 400.32, 400.33, 700
See application file for complete search history.

(56) References Cited

U.S. PATENT DOCUMENTS 6,771,039 B2 * 8/2004 Sakurai et al. ............... 318/722

FOREIGN PATENT DOCUMENTS

| JP | 200753829 | 3/2007 |
| JP | 2008099542 | 4/2008 |

* cited by examiner

*Primary Examiner* — Walter Benson
*Assistant Examiner* — David Luo
(74) *Attorney, Agent, or Firm* — NDQ&M Watchstone LLP

(57) ABSTRACT

To estimate an initial magnetic pole position, estimated control axes corresponding to the d-axis and q-axis are set as the γ-axis and δ-axis, and a with high frequency rotation voltage or alternating voltage on the γδ coordinate system applied to the motor. A high frequency current $i_h$ flowing in the motor is then extracted from a detected motor current (armature current) and a direct current component $(i_h\gamma \times i_h\delta)_{DC}$ of a product of the γ-axis and δ-axis components of the high frequency current $i_h$ is derived. Alternatively, the γ'-axis component $i_{ch}\gamma$ and the δ'-axis component 66 of the high frequency current $i_h$ that are shifted by π/4 in electric angle from the γ-axis and the δ-axis are used to obtain a direct current component of their product $(i_{ch}\gamma \times i_{ch}\delta)_{DC}$. The magnetic pole position is then estimated by computing the axial error Δθ between the γ-d axes utilizing the direct current components.

11 Claims, 19 Drawing Sheets

FIG. 1
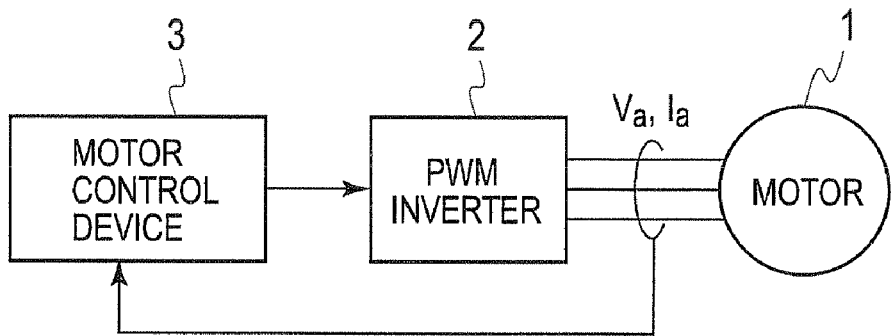
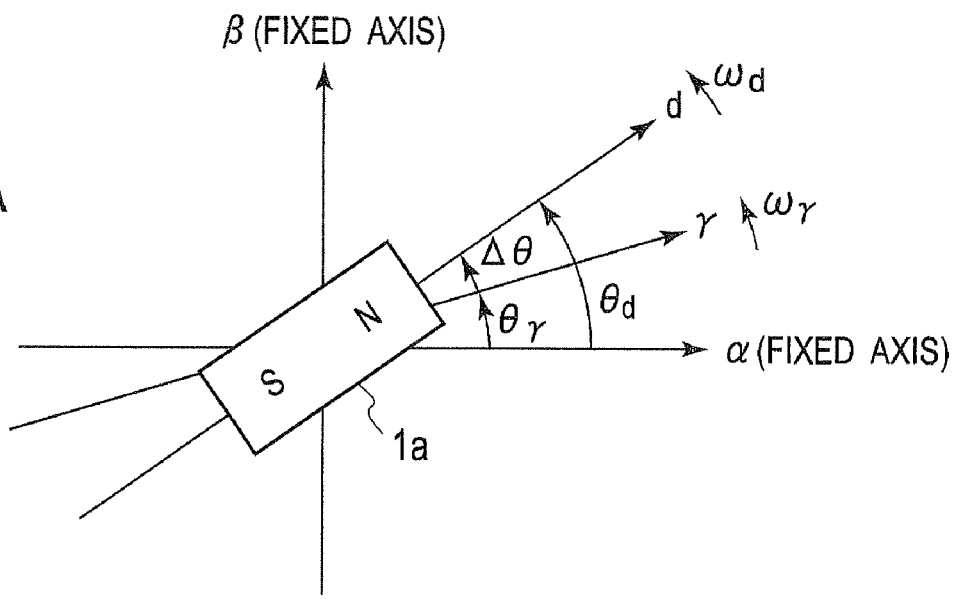
FIG. 2A
FIG. 2B
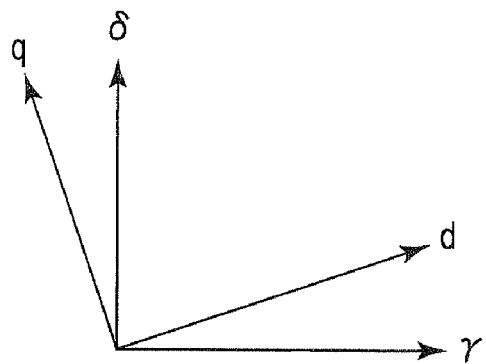

VOLTAGE VECTOR LOCUS

510

CURRENT VECTOR LOCUS 511
512

MOTOR CONTROL DEVICE

CROSS REFERENCE TO RELATED APPLICATIONS

This application claims priority based on 35 USC 119 from prior Japanese Patent Application No. P2008-211893 filed on Aug. 20, 2008, the entire contents of which are incorporated herein by reference.

BACKGROUND OF THE INVENTION

1. Field of the Invention

The present invention relates to a motor control device for controlling operation of a motor. The present invention also relates to a motor drive system and electrical equipment that utilizes the motor control device.

2. Description of Related Art

Conventionally, there exists already developed technology to detect a magnetic pole position (a rotor position) at a rotor of a motor without utilizing a position sensor. Such technology includes utilizing the application of a high-frequency rotation voltage or alternating voltage.

The applicant also previously proposed a method utilizing application of a high-frequency voltage (see Japanese Patent Laid-Open No. 2007-53829). In this method, estimated axes for control corresponding to a d-axis and a q-axis are set as a γ-axis and a d-axis respectively, and a high-frequency rotation voltage or alternating voltage on the γδ coordinate system is applied to a motor. A magnetic pole position is estimated based on a derived product of γ-axis and d-axis components of a high-frequency current that flows through the motor due to application of the high-frequency voltage.

In this conventional method, an axial error $\Delta\theta$ is estimated under the approximation that the axial error $\Delta\theta$ between the d-axis and the γ-axis as an estimation axis is close to zero, and therefore, it is necessary that the γ-axis as an estimation axis and the d-axis corresponding to the magnetic pole position coincide with each other. Thus, depending on the initial position of the estimated axis, that is, depending on the initial axial error $\Delta\theta$, there may be an instance in which the estimation takes a certain amount of time. Reasons for this will become more apparent by referring to the description in the embodiments of this invention.

If it takes a certain amount of time to estimate the initial magnetic pole position when trying to start a motor, it will take about that much time to start the motor as well. Delay in starting the motor leads to delay in starting the equipment in which the motor is installed such as an electric vehicle. Therefore, it is desired that the time required for estimating the magnetic pole position be shortened or minimized.

Therefore, an object of the invention is to provide a motor control device, a motor control system, and equipment which contribute to shortening the time required in estimating the magnetic pole position (the initial magnetic pole position) to control operation of a motor.

SUMMARY OF THE INVENTION

One aspect of the invention is a motor control device for controlling a motor based on an estimated magnetic pole position, the motor control device including a voltage applying unit for applying a voltage for estimation having a predetermined frequency to a motor; a current detection unit for detecting a current that flows through the motor in response to the application of the voltage; and a magnetic pole position estimation unit for estimating a magnetic pole position at a rotor of the motor based on the current detected by the current detection unit; in which the magnetic pole position estimation unit includes an estimation processing unit for deriving from first and second axis components of the current detected by the current detection unit: a first axis component, a second axis component, a third axis component, and a fourth axis component of a current for estimation that flows through the motor in response to application of the voltage for estimation, and estimating the magnetic pole position based on the first to the fourth axis components of the current for estimation; and in which in an electric angle expression, the first axis and the second axis are orthogonal to each other, and the third axis and the fourth axis are orthogonal to each other, and each of the third axis and the fourth axis differs from the first axis.

By utilizing current information of not only the first axis and the second axis but also current information of the third axis and the fourth axis that are different from the first axis and the second axis, it becomes possible to estimate the magnetic pole position stably and in a short amount of time regardless of the initial magnetic pole position.

In particular, the third axis and the fourth axis are for example shifted by p/4 in electric angle from the first axis and the second axis.

Also, the estimation processing unit may derive the first axis component and the second axis component of the current for estimation by extracting a predetermined frequency component from the first axis component and the second axis component of the current detected by the current detection unit, and may derive the third axis component and the fourth axis component of the current for estimation by utilizing a sum and a difference of the first axis component and the second axis component of the current for estimation.

Also, the estimation processing unit may estimate the magnetic pole position based on a product of the first axis component and the second axis component of the current for estimation, and a product of the third axis component and the fourth axis component of the current for estimation.

For example the estimation processing unit may estimate the magnetic pole position based on a direct current component of a product of the first axis component and the second axis component of the current for estimation, and a direct current component of a product of the third axis component and the fourth axis component of the current for estimation.

Further, the estimation processing unit may estimate the magnetic pole position by dividing the direct current component of the product of the first axis component and the second axis component of the current for estimation by a value including the direct current component of the product of the third axis component and the fourth axis component of the current for estimation.

Further, the estimation processing unit may derive the product of the third axis component and the fourth axis component of the current for estimation by utilizing square information of each of the first axis component and the second axis component of the current for estimation.

Also, the magnetic pole position estimated by utilizing the estimation processing unit may be treated as an initial magnetic pole position, and a subsequent magnetic pole position may be estimated based on such an initial magnetic pole position by a second estimation processing unit that is different from the estimation processing unit.

Also, the first axis may be an estimated axis for control corresponding to the d-axis of the rotor or a predetermined fixed axis.

Another aspect of the invention is a motor drive system having a motor, an inverter for driving rotation of the motor, and the motor control device as described above that controls the motor by controlling the inverter.

Still another aspect of the invention is electrical equipment having the motor drive system that operates by utilizing torque of a motor within the motor drive system. The electrical equipment for example could be an electric vehicle, an air conditioner, a washing machine, a drying machine, etc.

BRIEF DESCRIPTION OF THE DRAWINGS

FIG. 1 is a block diagram showing the general structure of a motor drive system according to one embodiment of the present invention.

FIGS. 2A and 2B are analytical model diagrams of the motor of FIG. 1.

DETAILED DESCRIPTION OF EMBODIMENTS

Figure 3:
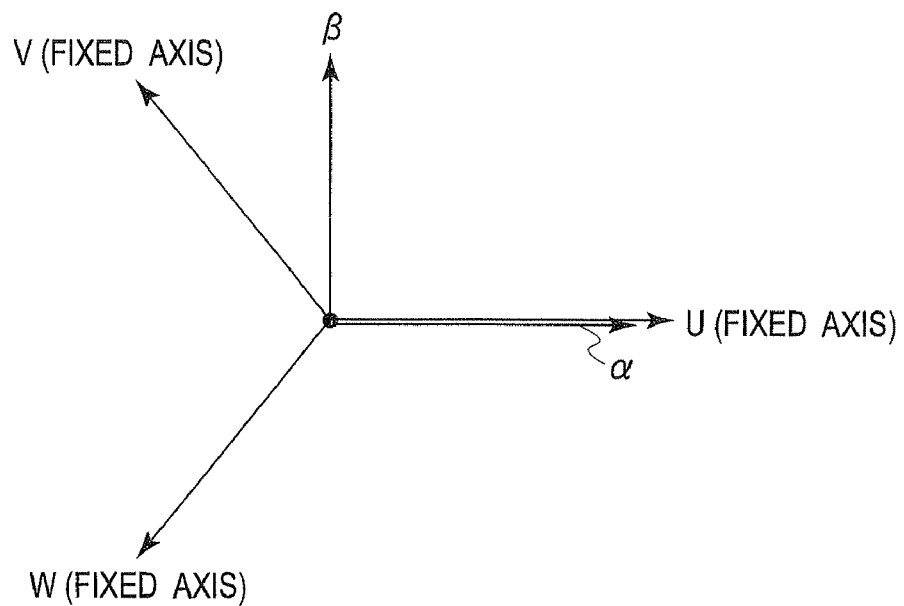
FIG. 3 is a graph showing U-phase, V-phase, and W-phase armature winding fixed axes and a and β fixed axes concerning the motor of FIG. 1.

Now, specific embodiments of the present invention will be described by referring to the drawings. In each of the drawings to be referred to, the same or similar reference numbers are assigned to the same or similar parts and overlapping explanations for the same parts are omitted in principle. The first to the eighth embodiments will be explained later, but matters common to each embodiment or the items being referred to in each embodiment will be explained first.

FIG. 1 is a general block diagram of a motor drive system according to a first embodiment of the present invention. The motor drive system of FIG. 1 includes a motor 1, a PWM (Pulse Width Modulation) inverter 2, and a motor control device 3. In the motor control device 3, control is performed without a position sensor, in which instead a magnetic pole position (a rotor position) of a rotor of the motor 1 is detected by an estimation procedure rather than utilizing a position signal from a position sensor.

The motor 1 is a three-phase permanent magnet synchronous motor and includes a rotor (not shown) with a permanent magnet and a stator (not shown) with three-phase armature windings. In the explanation below, in principle, the motor 1 is a salient pole machine such as an interior permanent magnet synchronous motor.

The PWM inverter (hereinafter referred to simply as "inverter") 2 supplies the motor 1 with a three-phase alternating voltage under control of the motor control device 3. The three-phase alternating voltage applied to the motor 1 by the inverter 2 consists of a U-phase voltage $v_u$ which represents a voltage applied to the U-phase armature winding, a V-phase voltage $v_v$ which represents a voltage applied to the V-phase armature winding, and a W-phase voltage $v_w$ which represents a voltage applied to the W-phase armature winding. The entire voltage applied to the motor 1, which is a combined voltage of the U-phase voltage $v_u$, the V-phase voltage $v_v$, and the W-phase voltage $v_w$, will be referred to as a motor voltage (motor terminal voltage) and will be represented by the symbol $V_a$.

The U-phase component, V-phase component, and W-phase component of the current supplied to the motor 1 from the inverter 2 by the application of the motor voltage $V_a$, that is, the current that flows through the U-phase, V-phase, and W-phase armature windings will be called a U-phase current $i_u$, a V-phase current $i_v$, and a W-phase current $i_w$ respectively. The entire current supplied to the motor 1, which is a combined current of the U-phase current $i_u$, the V-phase current $i_v$, and the W-phase current $i_w$, will be called a motor current (armature current) and will be represented by the symbol $I_a$.

The motor control device 3 provides PWM signals for achieving a desired control of the motor rotation (such as a vector control) to the inverter 2 while being based on a detected value of the motor current $I_a$.

FIGS. 2A and 2B are analytical model diagrams of the motor 1. In the explanation below, armature windings mean the ones provided in the motor 1. In FIG. 2A, the a-axis and the β-axis are shown, which are fixed axes that are fixed regardless of the rotation of the motor 1. The a-axis coincides with the U-phase armature winding fixed axis, for example, as shown in FIG. 3. However, the a-axis and the U-phase armature winding fixed axis may be different. The β-axis is an axis with its phase being advanced by 90 degrees in electric angle from the a-axis. FIG. 3 shows the U-phase, V-phase, and W-phase armature winding fixed axes as well as the a-axis and the β-axis. In space vector diagrams including FIGS. 2A, 2B, and 3, the counterclockwise rotation direction corresponds to a phase advancement.

In FIG. 2A, reference numeral 1a denotes a permanent magnet provided at a rotor of the motor 1. In a rotating coordinate system that rotates at the same speed as the rotation speed of the magnetic flux created by the permanent magnet 1a, the axis that follows the direction of the magnetic flux created by the permanent magnet 1a is set as the d-axis. Thus, the direction of the d-axis coincides with the direction of the magnetic flux created by the permanent magnet 1a. On the other hand, an estimated axis for control corresponding to the d-axis is set as the γ-axis. The γ-axis is defined at the motor control device 3 for controlling the motor 1. Moreover, as shown in FIG. 2B, the axis whose phase is advanced by 90 degrees in electric angle from the d-axis is set as the q-axis, and the axis whose phase is advanced by 90 degrees in electric angle from the γ-axis is set as the d-axis. The a-axis and the β-axis will be called collectively as aβ axes and the coordinate system that takes the a-axis and the β-axis as its coordinate axes will be called the aβ coordinate system. The d-axis and the q-axis will be called collectively as the dq axes and the coordinate system that takes the d-axis and the q-axis as its coordinate axes will be called the dq coordinate system. The γ-axis and the d-axis will be called collectively as γδ axes and the coordinate system that takes the γ-axis and the d-axis as its coordinate axes will be called the γδ coordinate system.

The aβ coordinate system is a fixed coordinate system, but the dq coordinate system and the γδ coordinate system are rotating coordinate systems. The rotation speed of the dq axes and the dq coordinate system is expressed as $\omega_d$ and the rotation speed of the γδ axes and the γδ coordinate system is expressed as $\omega\gamma$.

The angle (phase) of the d-axis from the a-axis is denoted by $\theta_d$ and the angle (phase) of the γ-axis from the a-axis is denoted by $\theta_\gamma$. The angles represented by $\theta_d$ and $\theta_\gamma$ are angles in electric phase angle, and the rotation speeds represented by $\omega_d$ and $\omega\gamma$ are angular speeds in electric phase angle. Also, the angle (phase) of the d-axis from the γ-axis, that is, an axial error between the γ-axis and the d-axis is expressed as Δθ; $\Delta\theta = \theta_d - \theta\gamma$. $\theta_d$ also is called a magnetic pole position (or a rotor position). When the γ-axis is an estimated axis for the d-axis, θγ represents an estimated magnetic pole position (estimation for the magnetic pole position $\theta_d$) and ωγ represents an estimated rotation speed (estimation for the rotation speed $\omega_d$).

Symbols involved in the control of the motor drive system are defined as follows:

The d-axis component, the q-axis component, the γ-axis component, the d-axis component, the a-axis component, and the β-axis component of the motor voltage $V_a$ will be referred to respectively a d-axis voltage, a q-axis voltage, a γ-axis voltage, a d-axis voltage, an a-axis voltage, and a β-axis voltage, and will be represented by the symbols $v_d$, $v_q$, vγ, vd, va and vβ.

The d-axis component, the q-axis component, the γ-axis component, the d-axis component, the a-axis component, and the β-axis component of the motor current i will be referred to respectively as a d-axis current, a q-axis current, a γ-axis current, a d-axis current, an a-axis current, and a β-axis current, and will be represented by the symbols $i_d$, $i_q$, iγ, id, ia and iβ.

$F_a$ represents flux-linkage of the armature windings by the permanent magnet 1a.

$L_d$ and $L_q$ respectively represent d-axis inductance (the d-axis component of armature winding inductance) and q-axis inductance (the q-axis component of armature winding inductance).

$R_a$ represents a resistance value per phase of the armature winding.

$F_a$, $L_d$, $L_q$, and $P_n$ are predetermined according to the characteristics of the motor 1 and are utilized as parameters for control of the motor drive system.

Target values for the γ-axis voltage vγ and the d-axis voltage vd that the γ-axis voltage vγ and the d-axis voltage vd are to follow are represented by a γ-axis voltage command value vγ* and a d-axis voltage command value vd* respectively.

Target values for the γ-axis current iγ and the d-axis current id that the γ-axis current iγ and the d-axis current id are to follow are represented by a γ-axis current command value iγ* and a d-axis current command value id* respectively.

A target value for the rotation speed ωγ (or $\omega_d$) that the rotation speed ωγ (or $\omega_d$) is to follow is represented by a rotation speed command value ω*.

The symbolic description vγ may also be used to represent a value of the γ-axis voltage. The same thing applies to the symbols representing state quantities other than the vγ (including state quantities concerning current and voltage). In addition, in this specification, for simplicity of description, there is an instance in which a name corresponding to a symbol may be omitted or simplified by describing its symbol (such as iγ). In other words, in this specification, for example, "iγ", "γ-axis current iγ" and "γ-axis current value iγ" may indicate the same thing.

[Estimation Principle of Magnetic Pole Position]

Next, a principle of the estimation of the magnetic pole position according to the invention will be explained. Now, in a motor drive system (such as the motor drive system of FIG. 13 as will be described below) that is feedback-controlled such that the γ-axis current iγ and the d-axis current id follow the γ-axis current command value iγ* and the d-axis current command value id*, it is considered that a high frequency superposed voltage for magnetic pole position estimation is superposed onto the γ-axis voltage command value vγ* and the d-axis voltage command value vd* that are generated according to the γ-axis current command value iγ* and the d-axis current command value id*. This superposed voltage for example is a rotation voltage with its voltage vector locus forming a circle.

The current (current vector) having the γ-axis current command value iγ* and the d-axis current command value id* as its γ-axis and d-axis component current values represents a drive current for driving the motor 1, and the voltage (voltage vector) having the γ-axis voltage command value vγ* and the d-axis voltage command value vd* as its γ-axis and d-axis component voltage values represents a drive voltage applied to the motor 1 in order to apply the drive current to the motor 1. By superposing the above-described superposed voltage onto the drive voltage, a superposed current (current for estimation) corresponding to the superposed voltage (voltage for estimation) is superposed onto the drive current.

Figure 4:
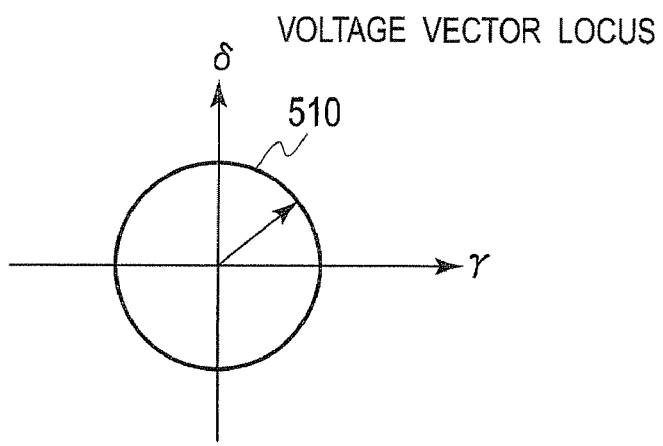
FIG. 4 is a diagram showing a voltage vector locus of a perfect circle rotation voltage that may be applied to the motor of FIG. 1.

Here, the "high frequency" of the superposed voltage means that a frequency of the superposed voltage is sufficiently higher than a frequency of the drive voltage. Therefore, a frequency of the superposed current that is added in accordance with the superposed voltage is sufficiently higher than a frequency of the drive current. In addition, the "rotation voltage" means such a voltage that the voltage vector locus forms a circle on the γδ coordinate system, such as a voltage vector locus 510 of FIG. 4. For example, if the rotation voltage is a three-phase balanced voltage when considered in the three-phase, the voltage vector locus forms a perfect circle with its center at the origin on the γδ coordinate system, such as the voltage vector locus 510 of FIG. 4. Since this rotation voltage is a high frequency voltage that is not synchronous with the motor 1, applying this rotation voltage does not cause rotation of the motor 1.

Figure 5:
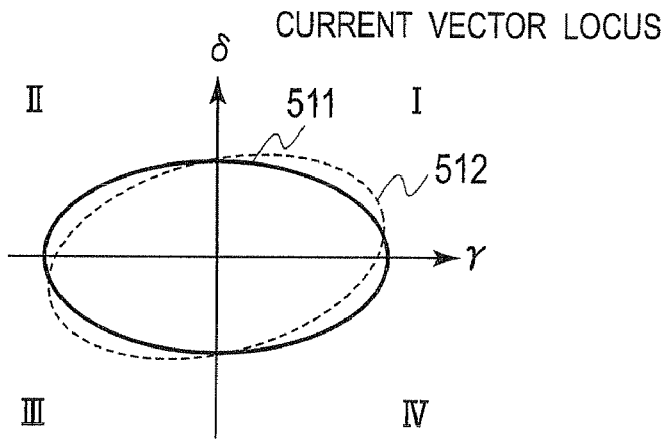
FIG. 5 is a diagram showing a current vector locus of a current that flows in the motor caused by applying the perfect circle rotation voltage.

If the motor 1 is an interior permanent magnet synchronous motor or the like, and $L_d < L_q$ holds, the current vector locus of the superposed current that flows in the motor 1 by the superposed voltage forming the voltage vector locus 510 forms an ellipse having the major axis in the γ-axis direction and the minor axis in the d-axis direction with the center on the origin of the γδ coordinate system, as shown by a current vector locus 511 of FIG. 5. Here, the current vector locus 511 is a current vector locus in the case in which the axial error Δθ is zero. If the axial error Δθ is not zero, the current vector locus of the superposed current becomes an ellipse as shown by a current vector locus 512, which has a major axis (or a minor axis) that does not match the γ-axis direction (or the d-axis direction). More specifically, if the axial error Δθ is not zero, the current vector locus 512 is inclined with the center at the origin of the γδ coordinate system in such a way as shown for example in FIG. 5 due to the salient magnetic polar character of the motor 1.

When the γ-axis component and the d-axis component of the superposed current are referred to as a γ-axis superposed current $i_h\gamma$ and $i_h d$ respectively, their product ($i_h\gamma \times i_h d$) includes a direct current component depending on a gradient of the ellipse expressed in the current vector locus 512. The product ($i_h\gamma \times i_h d$) has a positive value in the first and third quadrants of the current vector locus, while it has a negative value in the second and fourth quadrants thereof. Therefore, the direct current component is not included if the ellipse is not inclined (as shown by the current vector locus 511), whereas the direct current component is included if the ellipse is inclined (as shown by the current vector locus 512). Note that quadrants I, II, III, and IV shown in FIG. 5 (and in FIG. 7 etc. as will be described below) respectively represent the first, second, third, and fourth quadrants on the γδ coordinate system.

In a state that Δθ≈0°, the direct current component of the product ($i_h\gamma \times i_h d$) increases as a value of the axial error Δθ increases (i.e. it is approximately proportional to the axial error Δθ). Therefore, if this direct current component is controlled such that it converges to zero, the axial error Δθ converges to zero.

The superposed voltage can be expressed in the following equation (A-1). Here, $v_h\gamma^*$ and $v_h d^*$ denote the γ-axis component and the d-axis component of the superposed voltage added to the drive voltage ($v\gamma^*$ and $vd^*$). Reference letter $\omega_h$ in the equation (A-1) represents a frequency of the $v_h\gamma^*$ and $v_h d^*$ (electric angular speed on the γδ coordinate system), and $V_h\gamma$ and $V_h d$ denote an amplitude of the superposed voltage in the γ-axis direction (i.e. an amplitude of $v_h\gamma^*$) and an amplitude of the superposed voltage in the d-axis direction (i.e. an amplitude of $v_h d^*$) respectively. In addition, reference letter t represents time.

$$\begin{bmatrix} v_{h\gamma}^* \\ v_{h\delta}^* \end{bmatrix} = \begin{bmatrix} V_{h\gamma}\cos(\omega_h t) \\ V_{h\delta}\sin(\omega_h t) \end{bmatrix} \quad (A\text{-}1)$$

Figure 6:
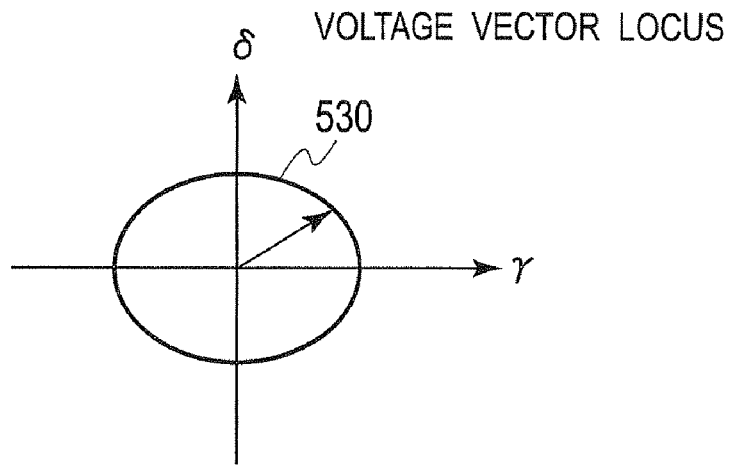
FIG. 6 is a diagram showing a voltage vector locus of an ellipsoidal rotation voltage that may be applied to the motor of FIG. 1.

In a case that a rotation voltage is superposed as the superposed voltage, the amplitude $V_h\gamma$ in the γ-axis direction and the amplitude $V_h d$ in the d-axis direction of the superposed voltage may match or may differ. FIG. 6 shows a voltage vector locus 530 of the rotation voltage as the superposed voltage in a case that the amplitude $V_h\gamma$ is made relatively larger than the amplitude $V_h d$. The voltage vector locus 530 forms an ellipse having its major axis in the γ-axis direction and its minor axis in the d-axis direction with the center at the origin of the γδ coordinate system.

Figure 7:
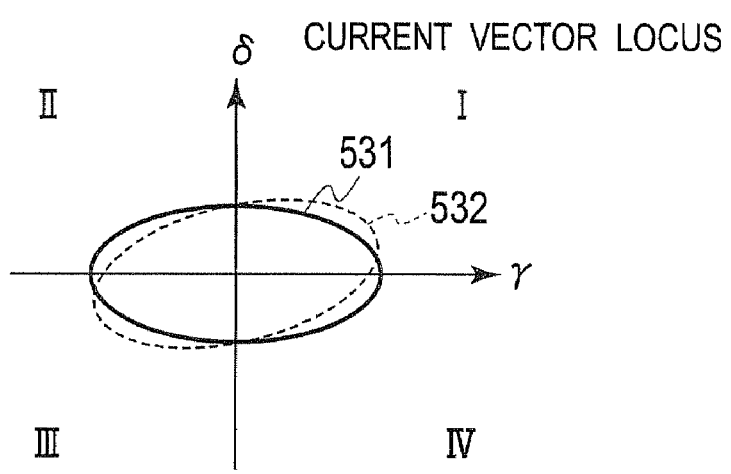
FIG. 7 is a diagram showing a current vector locus of a current that flows in the motor caused by applying the ellipsoidal rotation voltage.

FIG. 7 shows a current vector locus (531 and 532) of the superposed current that flows in accordance with superposition of the superposed voltage represented by the voltage vector locus 530. In this case also, if the axial error Δθ is zero, a current vector locus of the superposed current forms an ellipse having its major axis in the γ-axis direction with its center at the origin of the γδ coordinate system as the current vector locus 531, and therefore, the product ($i_h\gamma \times i_h d$) does not have a direct current component. On the other hand, if the axial error Δθ is not zero, the current vector locus of the superposed current becomes inclined with the center at the origin from the current vector locus 531 as shown by the current vector locus 532, and therefore, the product ($i_h\gamma \times i_h d$) starts to have a direct current component.

Figure 8:
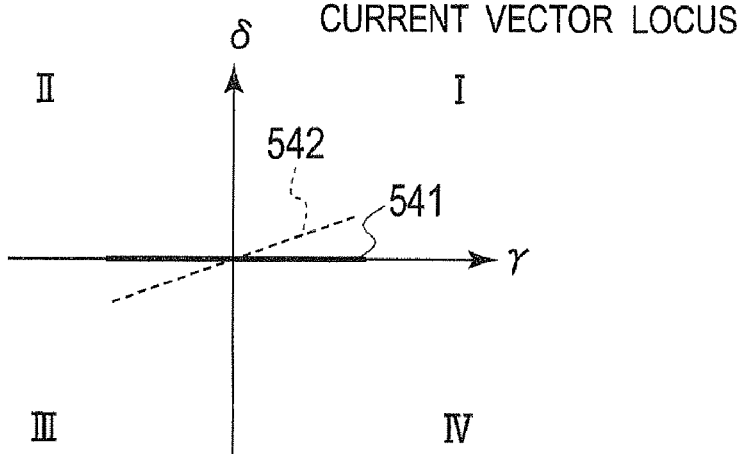
FIG. 8 is a diagram showing a current vector locus of a current that flows in the motor caused by applying an alternating voltage in the γ-axis direction.

Moreover, it is possible that an alternating voltage is adopted as the superposed voltage. For example, if $V_h\gamma \neq 0$ and $V_h d \neq 0$, an alternating voltage in the γ-axis direction becomes the superposed voltage, and a voltage vector locus of this superposed voltage forms a line segment on the γ-axis with its center at the origin of the γδ coordinate system. In this case also, if the axial error Δθ is zero, a current vector locus of the superposed current forms a line segment on the γ-axis with its center at the origin of the γδ coordinate system as shown by the current vector locus 541 of FIG. 8, and therefore, the product ($i_h\gamma \times i_h d$) does not have a direct current component. On the other hand, if the axial error Δθ is not zero, the current vector locus of the superposed current becomes inclined with the center at the origin as shown by the current vector locus 542 from the current vector locus 541, and therefore, the product ($i_h\gamma \times i_h d$) starts to have a direct current component.

(i) Derivation of Theoretical Formula of Axial Error

Theoretical formulas regarding axial error estimation now will be explained. First, the equation concerning the superposed component is expressed in the following equation (B-1). Here, the following equations (B-2a), (B-2b), (B-2c), (B-2d) and (B-2e) hold. Note that p denotes the differential operator.

$$p\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \begin{bmatrix} v_{h\gamma}^* \\ v_{h\delta}^* \end{bmatrix} \quad (B\text{-}1)$$

$$L_\gamma = L_0 + L_1\cos 2\Delta\theta \quad (B\text{-}2\,a)$$

$$L_\delta = L_0 - L_1\cos 2\Delta\theta \quad (B\text{-}2\,b)$$

$$L_{\gamma\delta} = L_1\sin 2\Delta\theta \quad (B\text{-}2\,c)$$

-continued $$L_0 = \frac{L_d + L_q}{2} \tag{B-2 d}$$

$$L_1 = \frac{L_d - L_q}{2} \tag{B-2 e}$$

If the applied superimposed voltage is expressed in the above equation (A-1), the orthogonal two-axes components $i_h\gamma$ and $i_h$d of the superposed current that flows corresponding to the application of the superposed voltage are expressed in the following equation (B-3) (since the γ-axis and the d-axis are orthogonal, $i_h\gamma$ and $i_h$d can be called collectively as orthogonal two-axes components). Note that "s" in the equation (B-3) is the Laplace operator, and $\theta_h = \omega_h t$.

$$\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \frac{1}{s} \begin{bmatrix} v^*_{h\gamma} \\ v^*_{h\delta} \end{bmatrix} \tag{B-3}$$

$$= \frac{1}{\omega_h L_d L_q} \begin{bmatrix} L_0 - L_1 \cos 2\Delta\theta & -L_1 \sin 2\Delta\theta \\ -L_1 \sin 2\Delta\theta & L_0 + L_1 \cos 2\Delta\theta \end{bmatrix}$$

$$\begin{bmatrix} V_{h\gamma} \sin\theta_h \\ -V_{h\delta} \cos\theta_h \end{bmatrix}$$

Organizing the product of the orthogonal two-axes components of the superposed current based on the above equation (B-3), the following equation (B-4) is obtained. Here, $K_1$ to $K_7$ are coefficients that are determined when $L_d$ and $L_q$ and the amplitudes of the superposed voltage ($V_h\gamma$ and $V_h$d if the superposed voltage in accordance with the above equation (A-1) is applied) are determined.

$$i_{h\gamma} \times i_{h\delta} = \tag{B-4}$$
$$K_1 \sin(2\Delta\theta) + K_2 \sin(4\Delta\theta) + K_3 \sin(2\theta_h) + K_4 \sin(2\Delta\theta + 2\theta_h) +$$
$$K_5 \sin(2\Delta\theta - 2\theta_h) + K_6 \sin(4\Delta\theta + 2\theta_h) + K_7 \sin(4\Delta\theta + 2\theta_h)$$

The direct current component of the product ($i_h\gamma \times i_h$d) is expressed as ($i_h\gamma \times i_h$d)$_{DC}$. This direct current component is expressed in the equation (B-5) since it has no term variable to $\theta_h$.

$$(i_{h\gamma} \times i_{h\delta})_{DC} = K_1 \sin(2\Delta\theta) + K_2 \sin(4\Delta\theta) \tag{B-5}$$

If $\Delta\theta \approx 0$, the approximations "$\sin(2\Delta\theta) \approx 2\Delta\theta$" and "$\sin(4\Delta\theta) \approx 4\Delta\theta$" hold. Therefore, the axial error $\Delta\theta$ can be estimated as a value that is proportional to $(i_h\gamma \times i_h$d$)_{DC}$. If the superposed voltage is a perfect circle rotation voltage (that is, in a case that $V_h\gamma = V_h$d$\neq 0$), the coefficient $K_2$ becomes zero so that the sine term of quadruple $\Delta\theta$ is eliminated from the equation (B-5).

The method to estimate the axial error $\Delta\theta$ based only on the sine term information is based on the assumption that $\Delta\theta \approx 0$. Therefore, in a case that the initial axial error (the axial error at the time of starting estimation) is relatively large, the estimated axial error would be considerably smaller than the actual error value, and as a result, there may be an instance in which it takes a long time for the estimated axial error to converge to the actual value.

(ii) Derivation of Theoretical Formula of Axial Error Without Using Process of $\Delta\theta \approx 0$ An estimation method of the axial error according to the invention that takes this into consideration now will be explained. In the axial error estimation method according to the invention, the assumption of $\Delta\theta \approx 0$ is unnecessary by utilizing cosine information also.

Figure 9:
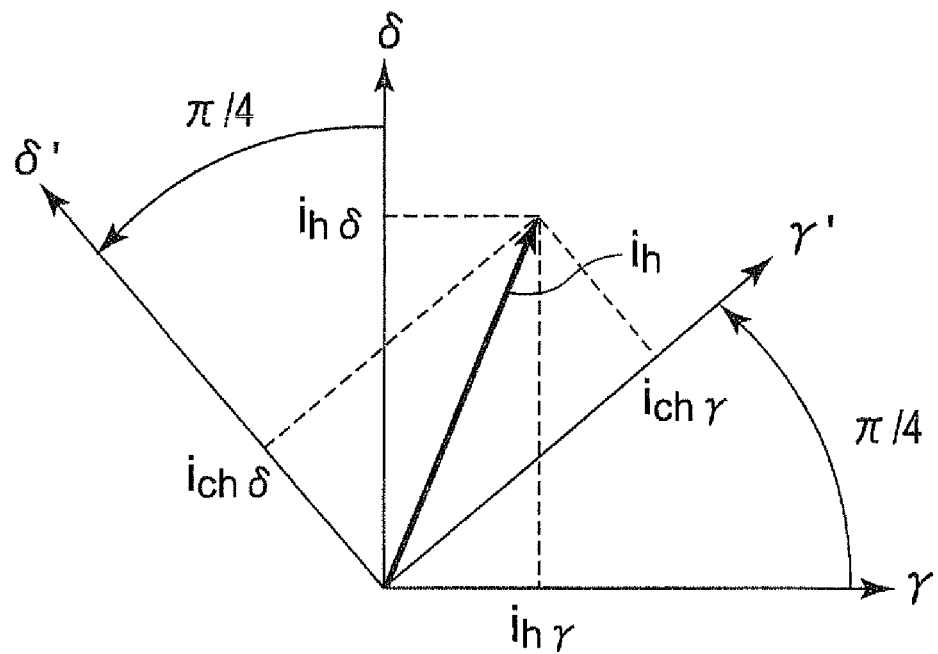
FIG. 9 is a diagram showing a phase relationship of the γ-axis, the d-axis, the γ'-axis, and the d'-axis.

As shown in FIG. 9, the axis advanced by p/4 in electric angle from the γ-axis is called a γ'-axis, and the axis advanced by p/4 in electric angle from the d-axis is called a d'-axis. The current vector formed by $i_h\gamma$ and $i_h$d, that is, a vectorial representation of the superposed current is represented by $i_h$. $i_h\gamma$ and $i_h$d are the γ-axis component and the d-axis component of the current vector $i_h$ respectively. On the other hand, γ'-axis component and the d'-axis component of the current vector $i_h$ are represented by $i_{ch}\gamma$ and $i_{ch}$d respectively. $i_{ch}\gamma$ and $i_{ch}$d correspond to coordinate conversion of $i_h\gamma$ and $i_h$d in the rotation direction by p/4 in electric angle. $i_{ch}\gamma$ and $i_{ch}$d also can be called orthogonal two-axes components of the superposed current. The relationship among $i_h\gamma$ and $i_h$d, and $i_{ch}\gamma$ and $i_{ch}$d is expressed in the following equation (B-6).

$$\begin{bmatrix} i_{ch\gamma} \\ i_{ch\delta} \end{bmatrix} = \begin{bmatrix} \cos(\pi/4) & -\sin(\pi/4) \\ \sin(\pi/4) & \cos(\pi/4) \end{bmatrix} \begin{bmatrix} i_{h\gamma} \\ i_{h\delta} \end{bmatrix} \tag{B-6}$$

$$= \frac{1}{\sqrt{2}} \begin{bmatrix} 1 & -1 \\ 1 & 1 \end{bmatrix} \begin{bmatrix} i_{h\gamma} \\ i_{h\delta} \end{bmatrix}$$

$$= \frac{1}{\sqrt{2}} \begin{bmatrix} i_{h\gamma} - i_{h\delta} \\ i_{h\gamma} + i_{h\delta} \end{bmatrix}$$

The product of $i_{ch}\gamma$ and $i_{ch}$d, i.e. ($i_{ch}\gamma \times i_{ch}$d), is expressed in the following formula (B-7). Organizing the formula (B-7) based on the above equation (B-3), the following equation (B-8) is obtained. Here, $K_0$ to $K_2$ and $K_3'$ to $K_7'$ are coefficients that are determined when $L_d$ and $L_q$ and the amplitudes of the superposed voltage ($V_h\gamma$ and $V_h$d if the superposed voltage in accordance with the above equation (A-1) is applied) are determined.

$$i_{ch\gamma} \times i_{ch\delta} = (i_{h\gamma} - i_{h\delta}) \cdot (i_{h\gamma} + i_{h\delta})/2 = (i^2_{h\gamma} - i^2_{h\gamma})/2 \tag{B-7}$$

$$i_{ch\gamma} \times i_{ch\delta} = K_0 + K_1 \cos(2\Delta\theta) + K_2 \cos(4\Delta\theta) + \tag{B-8}$$
$$K'_3 \cos(2\theta_h) + K'_4 \cos(2\Delta\theta + 2\theta_h) + K'_5 \cos(2\Delta\theta - 2\theta_h) +$$
$$K'_6 \cos(4\Delta\theta + 2\theta_h) + K'_7 \cos(4\Delta\theta - 2\theta_h)$$

The direct current component of the product ($i_{ch}\gamma \times i_{ch}$d) is expressed as ($i_{ch}\gamma \times i_{ch}$d)$_{DC}$. This direct current component is expressed in the equation (B-9) since it has no term variable to $\theta_h$.

$$(i_{ch\gamma} \times i_{ch\delta})_{DC} = K_0 + K_1 \cos(2\Delta\theta) + K_2 \cos(4\Delta\theta) \tag{B-9}$$

If the superposed voltage is a perfect circle rotation voltage (that is, in a case that $V_h\gamma = V_h$d$\neq 0$), the coefficients $K_0$ and $K_2$ become zero so that the offset term and the sine term of quadruple $\Delta\theta$ are eliminated from the equation (B-9). Regarding the two direct current components, ($i_h\gamma \times i_h$d)$_{DC}$ and ($i_{ch}\gamma \times i_{ch}$d)$_{DC}$, since $K_1 \gg K_2$, the approximation equations (B-10) and (B-11) hold (see also the equation (B-5) above) in a case that the superposed voltage is an ellipsoidal rotation voltage or an alternating voltage also.

$$(i_{h\gamma} \times i_{h\delta})_{DC} \approx K_1 \sin(2\Delta\theta) \tag{B-10}$$

$$(i_{ch\gamma} \times i_{ch\delta})_{DC} \approx K_1 \cos(2\Delta\theta) + K_0 \tag{B-11}$$

Using the approximation equations (B-10) and (B-11), the axial error $\Delta\theta$ is obtained by the equation (B-12). The axial error $\Delta\theta$ also can be obtained by the equation (B-13) or (B-14) that corresponds to a modified equation of the equation (B-12) (see the above equation (B-7)). (($i_h\gamma + i_h$d)($i_h\gamma - i_h$d))$_{DC}$ indicates a direct current component of the product $(i_h\gamma+i_hd)$ $(i_h\gamma-i_hd)$, and $(i_h\gamma^2-i_hd^2)_{DC}$ indicates a direct current component of the value $(i_h\gamma^2-i_hd^2)$.

$$\Delta\theta = \frac{1}{2}\tan^{-1}\left(\frac{\sin(2\Delta\theta)}{\cos(2\Delta\theta)}\right) \quad \text{(B-12)}$$

$$= \frac{1}{2}\tan^{-1}\left(\frac{(i_{h\gamma} \times i_{h\delta})_{DC}}{(i_{ch\gamma} \times i_{ch\delta})_{DC} - K_0}\right)$$

$$\Delta\theta = \frac{1}{2}\tan^{-1}\left(\frac{2(i_{h\gamma} \times i_{h\delta})_{DC}}{((i_{h\gamma}+i_{h\delta})(i_{h\gamma}-i_{h\delta}))_{DC} - 2K_0}\right) \quad \text{(B-13)}$$

$$\Delta\theta = \frac{1}{2}\tan^{-1}\left(\frac{2(i_{h\gamma} \times i_{h\delta})_{DC}}{(i_{h\gamma}^2 - i_{h\delta}^2)_{DC} - 2K_0}\right) \quad \text{(B-14)}$$

For example by performing a control to bring the computed axial error $\Delta\theta$ to zero, the γ-axis comes to follow the d-axis, and the estimated axis for control (the γ-axis) can be regarded as the d-axis. In other words, it is possible to estimate the phase $\theta_d$ (magnetic pole position) of the d-axis.

Moreover, rather than carrying out an operation of $\tan^{-1}$, the axial error $\Delta\theta$ may be computed by switching between utilizing information concerning sine and utilizing information concerning cosine. For example, when indicating the information concerning sine as $S_1$ and the information concerning cosine as $C_1$ respectively, as shown in the following equations (B-15) and (B-16), the axial error $\Delta\theta$ is derived by the following equation (B-17). That is, When the inequality expressions "$|S_1|<|C_1|$ and $C_1>0$" hold, the axial error $\Delta\theta$ is computed in accordance with $\Delta\theta=S_1/2$;

When the inequality expressions "$|S_1|>|C_1|$ and $S_1>0$" hold, the axial error $\Delta\theta$ is computed in accordance with $\Delta\theta=p/4-C_1/2$;

When the inequality expressions "$|S_1|>|C_1|$ and $S_1<0$" hold, the axial error $\Delta\theta$ is computed in accordance with $\Delta\theta=C_1/2-p/4$; and When the inequality expressions "$|S_1|<|C_1|$ and $C_1<0$" hold, the axial error $\Delta\theta$ is computed in accordance with $\Delta\theta=p/2-S_1/2$.

$$S_1 = (i_{h\gamma} \times i_{h\delta})_{DC} / K_1 \quad \text{(B-15)}$$

$$C_1 = ((i_{ch\gamma} \times i_{ch\delta})_{DC} - K_0) / K_1 \quad \text{(B-16)}$$

$$\Delta\theta = \begin{cases} S_1/2 & \text{if } |S_1|<|C_1| \text{ and } C_1>0 \\ \pi/4-C_1/2 & \text{if } |S_1|>|C_1| \text{ and } S_1>0 \\ C_1/2-\pi/4 & \text{if } |S_1|>|C_1| \text{ and } S_1<0 \\ \pi/2-S_1/2 & \text{if } |S_1|<|C_1| \text{ and } C_1<0 \end{cases} \quad \text{(B-17)}$$

The estimation method of the axial error $\Delta\theta$ has been explained with respect to the γδ-axes. This estimation method does not require the assumption of $\Delta\theta\approx 0$ since the approximation of $\sin(2\Delta\theta)\approx 2\Delta\theta$ is not utilized. Therefore, this estimation method can be applied to any arbitrary axis. For example, when using the aβ-axes, it is only necessary to apply a superposed voltage according to the following equation (C-1). Since the equations (C-2) and (C-3) hold, and the approximation equations (C-4) and (C-5) hold, the phase $\theta_d$ of the d-axis from the a-axis can be obtained by the equation (C-6), (C-7), or (C-8). However, the phase $\theta_d$ obtained by the equation (C-6), (C-7), or (C-8) is an estimated value of $\theta_d$ in the range of $-p/2$ to $p/2$, and thus, further determination of the polar character is necessary in order to estimate the phase $\theta_d$ in the range of $-p$ to $p$, details of which will be described below. In addition, since the γ-axis originally is an arbitrary axis that can be freely defined, if the γ-axis is used to resemble the a-axis, the following equations (C-2) to (C-8) can be derived from each of the above equations.

$$\begin{bmatrix} v_{ha}^* \\ v_{h\beta}^* \end{bmatrix} = \begin{bmatrix} v_{ha}\cos(\omega_h t) \\ v_{h\beta}\sin(\omega_h t) \end{bmatrix} \quad \text{(C-1)}$$

$$\begin{bmatrix} i_{cha} \\ i_{ch\beta} \end{bmatrix} = \begin{bmatrix} \cos(\pi/4) & -\sin(\pi/4) \\ \sin(\pi/4) & \cos(\pi/4) \end{bmatrix}\begin{bmatrix} i_{ha} \\ i_{h\beta} \end{bmatrix} \quad \text{(C-2)}$$

$$= \frac{1}{\sqrt{2}}\begin{bmatrix} 1 & -1 \\ 1 & 1 \end{bmatrix}\begin{bmatrix} i_{ha} \\ i_{h\beta} \end{bmatrix}$$

$$= \frac{1}{\sqrt{2}}\begin{bmatrix} i_{ha}-i_{h\beta} \\ i_{ha}+i_{h\beta} \end{bmatrix}$$

$$i_{cha} \times i_{ch\beta} = (i_{ha}-i_{h\beta})\cdot(i_{ha}+i_{h\beta})/2 = (i_{ha}^2-i_{h\beta}^2)/2 \quad \text{(C-3)}$$

$$(i_{ha} \times i_{h\beta})_{DC} \approx K_1\sin(2\theta_d) \quad \text{(C-4)}$$

$$(i_{ha} \times i_{h\beta})_{DC} \approx K_1\sin(2\theta_d) + K_0 \quad \text{(C-5)}$$

$$\theta_d = \frac{1}{2}\tan^{-1}\left(\frac{\sin(2\theta_d)}{\cos(2\theta_d)}\right) \quad \text{(C-6)}$$

$$= \frac{1}{2}\tan^{-1}\left(\frac{(i_{ha}\times i_{h\beta})_{DC}}{(i_{ha}\times i_{h\beta})_{DC}-K_0}\right)$$

$$\theta_d = \frac{1}{2}\tan^{-1}\left(\frac{2(i_{ha}\times i_{h\beta})_{DC}}{((i_{ha}+i_{h\beta})(i_{ha}-i_{h\beta}))_{DC}-2K_0}\right) \quad \text{(C-7)}$$

$$\theta_d = \frac{1}{2}\tan^{-1}\left(\frac{2(i_{ha}\times i_{h\beta})_{DC}}{(i_{ha}^2-i_{h\beta}^2)_{DC}-2K_0}\right) \quad \text{(C-8)}$$

Here, $v_h a^*$ and $v_h\beta^*$ denote the a-axis component and the β-axis component of the superposed voltage added to the drive voltage.

Reference letter $\omega_h$ in the equation (C-1) represents a frequency of the $v_h a^*$ and $v_h\beta^*$ (electric angular speed on the aβ coordinate system), and $V_h a$ and $V_h\beta$ denote an amplitude of the superposed voltage in the a-axis direction (i.e. an amplitude of $v_h a^*$) and an amplitude of the superposed voltage in the β-axis direction (i.e. an amplitude of $v_h\beta^*$) respectively. In addition, reference letter "t" represents time. If the superposed voltage is a perfect circle rotation voltage, $V_h a=V_h\beta\neq 0$. If the superposed voltage is an ellipsoidal rotation voltage, $V_h a\neq V_h\beta$, $V_h a\neq 0$, and $V_h\beta\neq 0$. If the superposed voltage is an alternating voltage, only one of $V_h a$ and $V_h\beta$ is zero.

Figure 10:
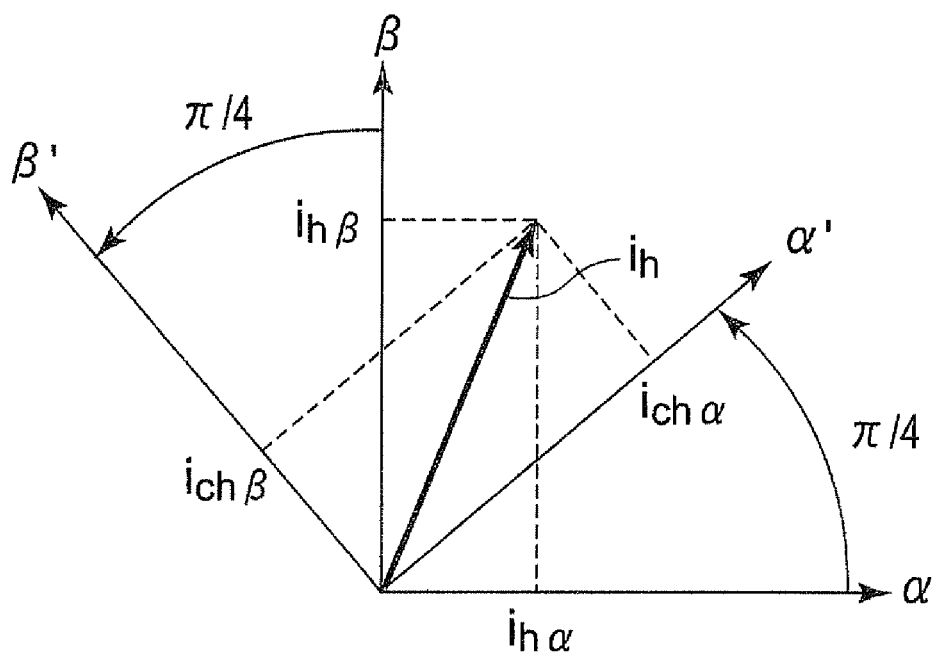
FIG. 10 is a diagram showing a phase relationship of the a-axis, the β-axis, the a'-axis, and the β'-axis.

Reference letters $i_h a$ and $i_h\beta$ denote the a-axis component and the β-axis component of the current vector $i_h$ respectively. Similarly to $i_h\gamma$ and $i_hd$, $i_h a$ and $i_h\beta$ also are orthogonal two-axes components of the superposed current. As shown in FIG. 10, the axis advanced by $p/4$ in electric angle from the a-axis is called an a'-axis, and the axis advanced by $p/4$ in electric angle from the β-axis is called a β'-axis. Reference letters $i_{ch}a$ and $i_{ch}\beta$ represent the a'-axis component and the β'-axis component of the current vector $i_h$ respectively. $i_{ch}a$ and $i_{ch}\beta$ correspond to coordinate conversion of $i_h a$ and $i_h\beta$ in the rotation direction by $p/4$ in electric angle. $i_{ch}\gamma$ and $i_{ch}d$ also can be called orthogonal two-axes components of the superposed current. $i_{ch}\gamma$ and $i_{ch}d$ also are orthogonal two-axes components of the superposed current. $(i_h a \times i_h\beta)_{DC}$ represents the direct current component of the product $(i_h a\times i_h\beta)$, and $(i_{ch}a\times i_{ch}\beta)_{DC}$ represents the direct current component of the product $(i_{ch}a\times i_{ch}\beta)$. Similarly, $((i_{ch}a+i_h\beta)(i_h a-i_h\beta))_{DC}$ represents the direct current component of the product $(i_h a+i_h\beta)$ ($i_h a - i_h \beta$), and $(i_h a^2 - i_h \beta^2)_{DC}$ represents the direct current component of the value $(i_h a^2 - i_h \beta^2)$.

Moreover, rather than carrying out an operation of $\tan^{-1}$, the phase $\theta_d$ may be computed by switching between utilizing information concerning sine and utilizing information concerning cosine. For example, when indicating the information concerning sine as $S_2$ and the information concerning cosine as $C_2$ respectively, as shown in the following equations (C-9) and (C-10), the phase $\theta_d$ is derived by the following equation (C-11) That is, When the inequality expressions "$|S_2|<|C_2|$ and $C_2>0$" hold, the phase $\theta_d$ is computed in accordance with $\theta_d = S_2/2$;

When the inequality expressions "$|S_2|>|C_2|$ and $S_2>0$" hold, the phase $\theta_d$ is computed in accordance with $\theta_d = p/4 - C_2/2$;

When the inequality expressions "$|S_2|>|C_2|$ and $S_2<0$" hold, the phase $\theta_d$ is computed in accordance with $\theta_d = C_2/2 - p/4$; and When the inequality expressions "$|S_2|<|C_2|$ and $C_2<0$" hold, the phase $\theta_d$ is computed in accordance with $\theta_d = p/2 - S_2/2$.

$$S_2 = (i_{h\alpha} \times i_{h\beta})_{DC} / K_1 \quad (C\text{-}9)$$

$$C_2 = ((i_{ch\alpha} \times i_{ch\beta})_{DC} - K_0) / K_1 \quad (C\text{-}10)$$

$$\theta_d = \begin{cases} S_2/2 & \text{if } |S_2| < |C_2| \text{ and } C_2 > 0 \\ \pi/4 - C_2/2 & \text{if } |S_2| > |C_2| \text{ and } S_2 > 0 \\ C_2/2 - \pi/4 & \text{if } |S_2| > |C_2| \text{ and } S_2 < 0 \\ \pi/2 - S_2/2 & \text{if } |S_2| < |C_2| \text{ and } C_2 < 0 \end{cases} \quad (C\text{-}11)$$

Figure 11A:
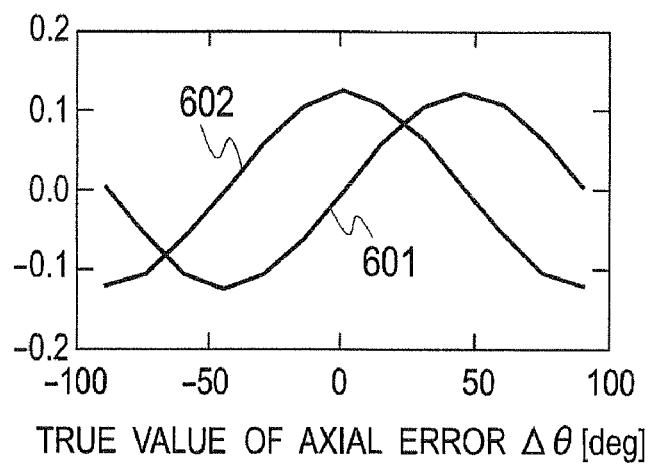
FIGS. 11A-11C are diagrams showing simulation results concerning axial error estimation.
Figure 11B:
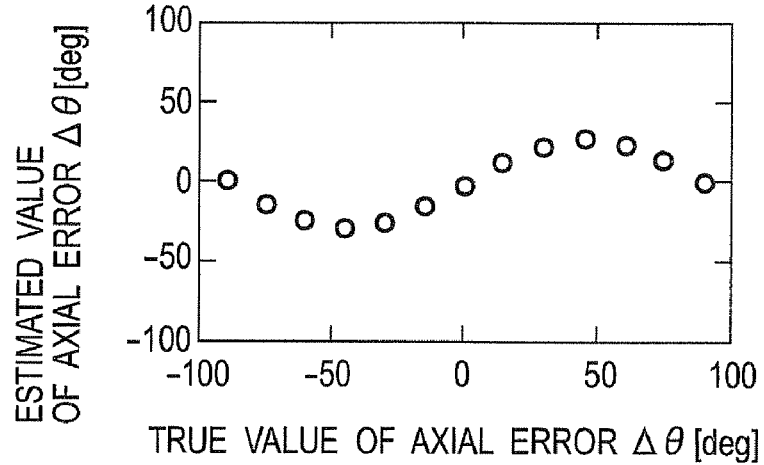
Figure 11C:
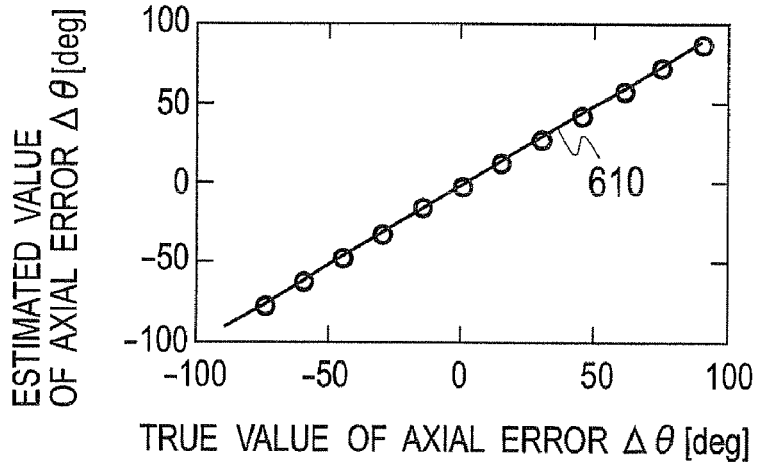
Figure 12A:
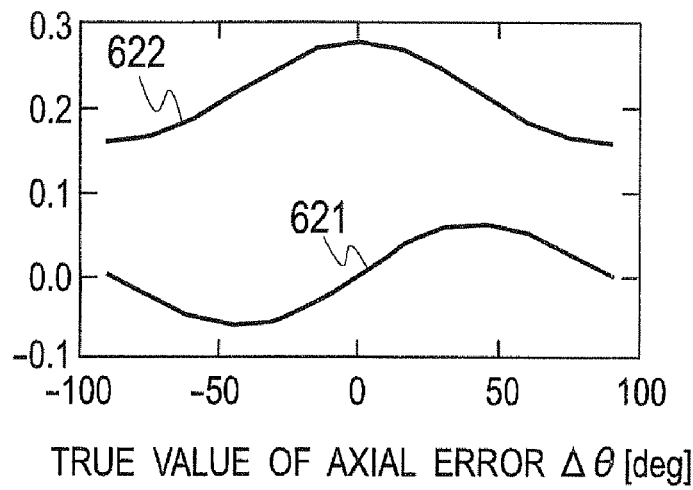
FIGS. 12A-12C are diagrams showing simulation results concerning axial error estimation.

FIGS. 11A to 11C and FIGS. 12A to 12C show simulation results of the above-described axial error estimation methods. The horizontal axes of FIGS. 11A to 11C and FIGS. 12A to 12C represent true values of the axial error $\Delta\theta$ (the unit is degree in electric angle). The vertical axes of FIG. 11A and FIG. 12A represent values of the direct current component $(i_h \gamma \times i_h d)_{DC}$ or $(i_{ch} \gamma \times i_{ch} d)_{DC}$. The vertical axes of FIGS. 11B and 11C, and FIGS. 12B and 12C represent an estimated value of the axial error $\Delta\theta$ (the unit is degree in electric angle).

FIGS. 11A to 11C show simulation results at the time when the superposed voltage is a perfect circle rotation voltage. The solid line 601 of FIG. 11A signifies an axial error $\Delta\theta$ dependence property of $(i_h \gamma \times i_h d)_{DC}$, and the solid line 602 of FIG. 11A signifies an axial error $\Delta\theta$ dependence property of $(i_{ch} \gamma \times i_{ch} d)_{DC}$. The group of white circles in FIG. 11B show the estimated values of the axial error $\Delta\theta$ that are computed based on the above equation (B-5) using the approximations of "$\sin(2\Delta\theta) \approx 2\Delta\theta$" and "$\sin(4\Delta\theta) \approx 4\Delta\theta$". On the other hand, the group of white circles in FIG. 11C show the estimated values of the axial error $\Delta\theta$ computed based on the above equations (B-12), (B-13), (B-14), or (B-17). The solid line 610 of FIG. 11C is a line drawn along the group of white circles of FIG. 11C.

Figure 12B:
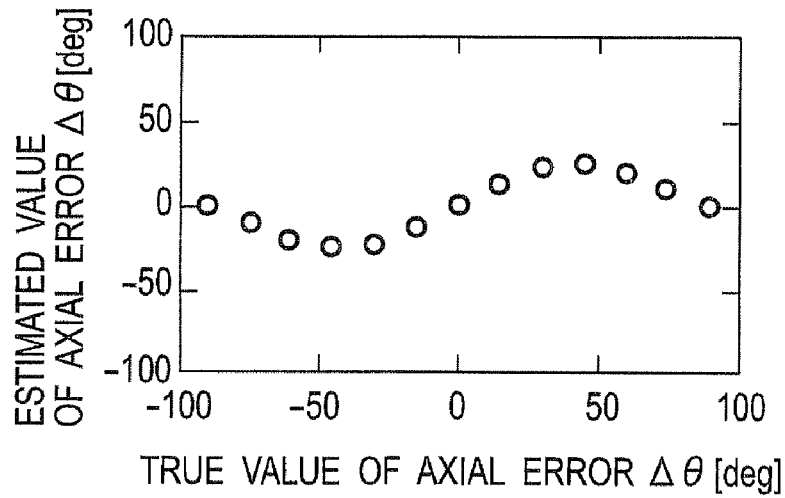
Figure 12C:
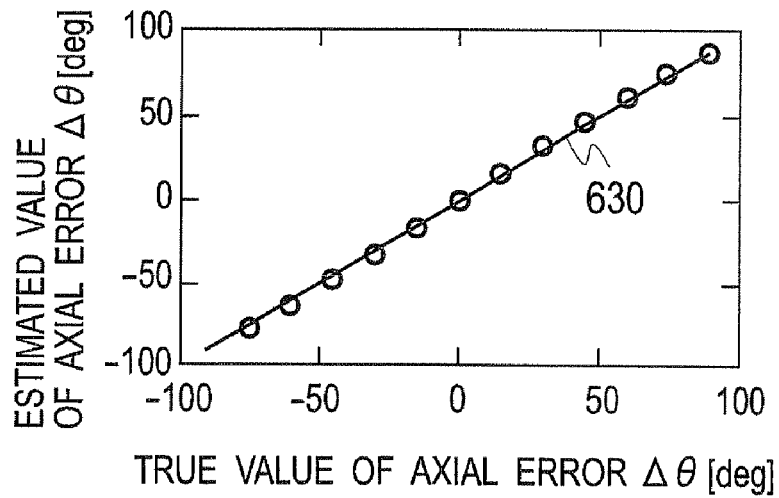

FIGS. 12A to 12C show simulation results at the time when the superposed voltage is an alternating voltage. The solid line 621 of FIG. 12A signifies an axial error $\Delta\theta$ dependence property of $(i_h \gamma \times i_h d)_{DC}$, and the solid line 622 of FIG. 12A signifies an axial error $\Delta\theta$ dependence property of $(i_{ch} \gamma \times i_{ch} d)_{DC}$. The group of white circles in FIG. 12B show the estimated values of the axial error $\Delta\theta$ that are computed based on the above equation (B-5) using the approximations of "$\sin(2\Delta\theta) \approx 2\Delta\theta$" and "$\sin(4\Delta\theta) \approx 4\Delta\theta$". On the other hand, the group of white circles in FIG. 12C show the estimated values of the axial error $\Delta\theta$ computed based on the above equations (B-12), (B-13), (B-14), or (B-17). The solid line 630 of FIG. 12C is a line drawn along the group of white circles of FIG. 12C.

As can be understood from FIG. 11B and FIG. 12B, in a state that the axial error $\Delta\theta$ is near zero, the difference between the true value and the estimated value of the axial error $\Delta\theta$ is small even if the axial error $\Delta\theta$ is estimated based only on $(i_h \gamma \times i_h d)_{DC}$ (that is, favorable estimation is performed). However, when the axial error $\Delta\theta$ becomes relatively large, the difference (that is, the estimation error) becomes large. On the other hand, as can be seen in FIGS. 11C and 12C, by performing the axial error estimation based on the above equations (B-12), (B-13), (B-14), or (B-17), the difference between the true values and the estimated values of the axial error $\Delta\theta$ is small regardless of the amplitude of the axial error $\Delta\theta$. That is, even when the phase of the $\gamma$-axis and the phase of the d-axis greatly differ, accurate axial error estimation becomes possible. In addition, it can be understood from the solid line 622 of FIG. 12A that $(i_{ch} \gamma \times i_{ch} d)_{DC}$ includes an offset component by the coefficient $K_0$.

As can be seen above, by utilizing such as the equation (B-12) upon consideration of the offset component by the coefficient $K_0$, it is possible to successfully estimate the axial error $\Delta\theta$, and consequently the magnetic pole position. Although there is a slight influence of the sine term of quadruple $\Delta\theta$, it is shown from these simulation results that such influence is minor. While FIGS. 11A to 11C and FIGS. 12A to 12C are simulation results as applied to the $\gamma\delta$-axes, successful magnetic pole position estimation is possible by utilizing the equations (C-6), (C-7), (C-8), or (C-11) also.

The estimation method of the magnetic pole position (axial error) based on the first to the fourth axis components of the superposed current as described above will be called an "estimation method based on four axis current components" for convenience below. The first, second, third, and fourth axes are either the $\gamma$-axis, the d-axis, the $\gamma'$-axis, and the d'-axis, or the a-axis, the $\beta$-axis, the a'-axis, and the $\beta'$-axis. The estimation method of the magnetic pole position (axial error) using the above-described equations (B-12), (B-13), (B-14), (B-17), (C-6), (C-7), (C-8), or (C-11) belongs to the estimation method based on four axis current components.

The superposed voltage actually added to the drive voltage can be any of the perfect circle rotation voltage, the ellipsoidal rotation voltage, and the alternating voltage as described above. However, if the ellipsoidal rotation voltage or the alternating voltage is used as the superposed voltage, information for $(i_{ch} \gamma \times i_{ch} d)_{DC}$ includes the offset component by the coefficient $K_0$, and since this offset component affects the estimation accuracy, it is necessary to provide an accurate offset component value to the motor control device 3 beforehand. On the other hand, if the perfect circle rotation voltage is adopted, the coefficient $K_0$ is zero, and thus, there is no need to find out the accurate offset component value. Moreover, in addition to making the estimation process easier, it does not produce an estimation error originated from the offset component.

In the case that the ellipsoidal rotation voltage or the alternating voltage is used as the superposed voltage, the value for the coefficient $K_0$ may be found out such as through experiments or simulations and may be provided to the motor control device 3 beforehand. If an alternating voltage in the d-axis direction (an alternating voltage having only the d-axis component) is used as the superposed voltage, it becomes unnecessary to apply a current that involves in the torque (the q-axis current) in order to estimate the magnetic pole position, and thus, torque fluctuation derived from the applied superposed voltage can be suppressed. Moreover, in the case that the ellipsoidal rotation voltage is utilized as the superposed voltage, if the major axis direction of the ellipse is made to coincide with the d-axis direction, a current involved in the torque (the q-axis current) can be made small, and thus torque fluctuation derived from the applied superposed voltage can be suppressed.

Meanwhile, a method is known that detects current values of the current that flows between an inverter 2 and a direct current power source (not shown) that supplies power to the inverter 2 using a current sensor and that derives current values of three-phase currents ($i_u$, $i_v$, and $i_w$) based on the detected current values (hereinafter referred to as a one-shunt current detection method) See for example Japanese Patent Laid-Open No. 2008-099542. Also, when the one-shunt current detection method is utilized, it is also known that three-phase currents cannot be detected when the voltage level difference between the maximum phase and the intermediate phase of the voltage and the voltage level difference between the minimum phase and the intermediate phase of the voltage among the phase voltages $v_u$, $v_v$, and $v_w$ become too close, and in order to avoid it, a correction with respect to each phase voltage is necessary. When such a voltage correction is performed, the superposed voltage for magnetic pole position estimation becomes different from an intended superposed voltage, and if the superposed voltage is the alternating voltage, the influence of the voltage correction becomes large. On the other hand, if the ellipsoidal rotation voltage is utilized as the superposed voltage, there is an advantage that the influence of the voltage correction is small.

Also, although the γ'-axis and the d'-axis were defined as axes advanced by p/4 in electric angle from the γ-axis and the d-axis respectively, it is also possible to carry out the above-described operations and the operations in each of the embodiments as described below upon defining that the γ'-axis and the d'-axis are axes advanced by $\theta_x$ in electric angle from the γ-axis and the d-axis respectively. Here, $\theta_x$ is an angle other than p/4 and other than zero (therefore, the γ'-axis differs from the γ-axis and the d-axis, and the d'-axis differs from the γ-axis and the d-axis). If the γ'-axis and the d'-axis are defined as axes with their phases advanced by $\theta_x$ in electric angle from the γ-axis and the d-axis respectively, there is an instance in which the coefficient $K_0$ does not become zero. In that case, the value for the coefficient $K_0$ may be found out beforehand such as through experiments or simulations and may be provided to the motor control device 3.

First to eighth embodiments will be explained below as embodiments for explaining structural examples or operative examples or technical matters involved therein for the motor drive system utilizing the above-described estimation method based on the four axis current components. The matters described in one embodiment may be applied to other embodiments unless they are contradictory.

First Embodiment

Figure 13:
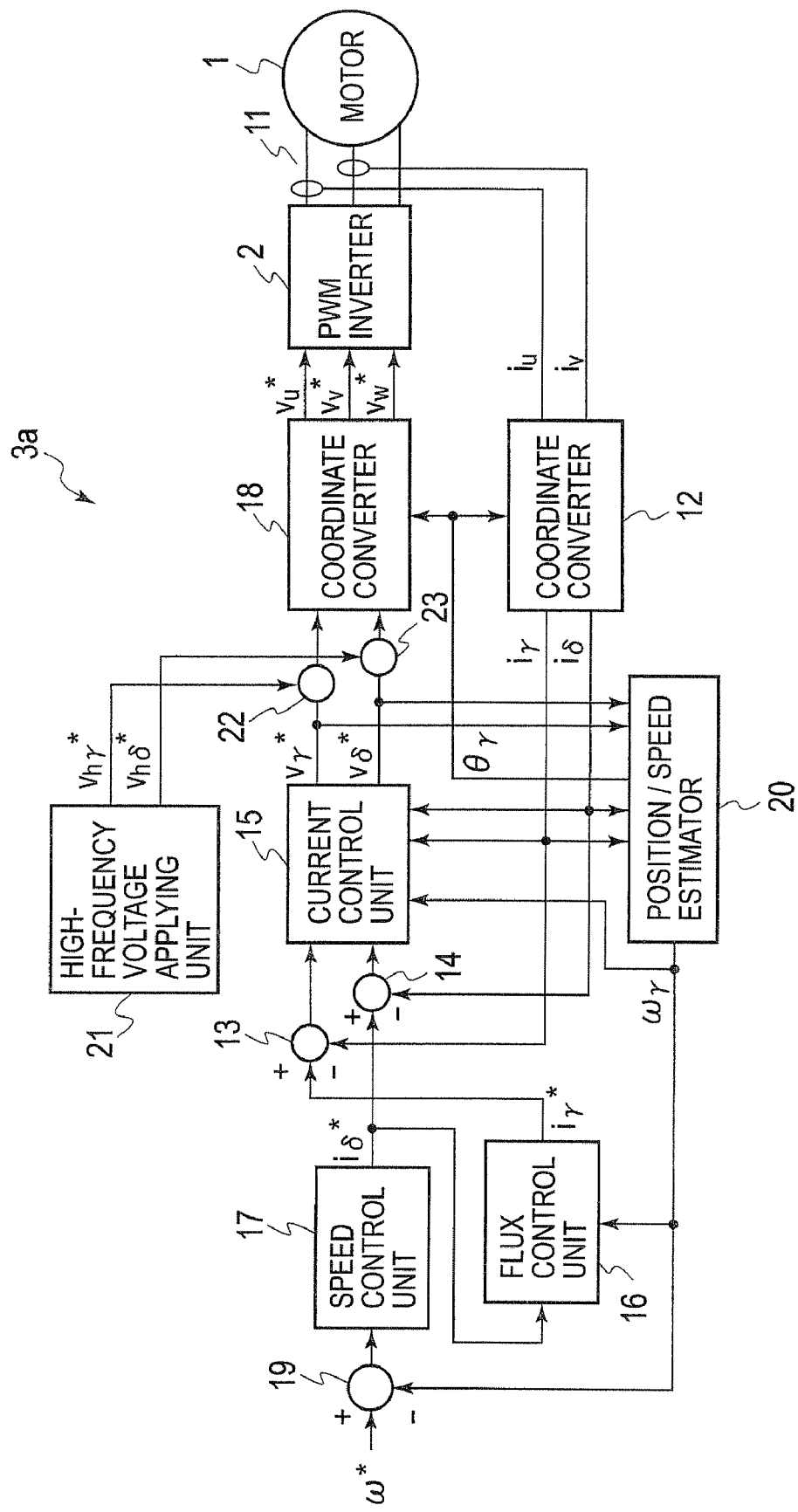
FIG. 13 is a block diagram of the motor drive system according to a first embodiment of the present invention.

Now, a first embodiment of the invention will be described. FIG. 13 is a block diagram of a motor drive system according to the first embodiment. The motor drive system of FIG. 13 includes the motor 1 and the inverter 2 of FIG. 1, as well as a motor control device 3a and a phase current sensor 11. The motor control device 3a may be utilized as the motor control device 3 of FIG. 1. The motor control device 3a includes each unit referred to by reference numbers 12 to 23. It also may be considered that the phase current sensor 11 is included in the motor control device 3a. Each unit within the motor control device 3a can freely utilize each value generated within the motor control device 3a.

Each unit that constitutes the motor drive system of this embodiment and each of the embodiments described below updates command values (such as vγ*, vd*, iγ*, id*) and state quantities (such as $i_u$, $i_v$, iγ, id, θγ and ωγ) that it computes (or detects) and outputs at a predetermined updating cycle, and carries out necessary operations utilizing the updated values.

The motor control device 3a performs a vector control of the motor 1 such that the axial error Δθ converges to zero. Therefore, in the first embodiment, the γ-axis, which is an estimated axis for control, is made to coincide with the d-axis corresponding to the magnetic pole position (in other words, the dq-axes are estimated).

The position/speed estimator 20 computes the phase θγ as the estimated magnetic pole position (that is, estimates the magnetic pole position), and also computes the rotation speed ωγ (that is, estimates the rotation speed of the motor 1). Methods for these computations will be described below.

The phase current sensor 11 detects a U-phase current value $i_u$ and a V-phase current value $i_v$ that are fixed axis components of the motor current $I_a$ supplied from the inverter 2 to the motor 1. The W-phase current value iw also may be computed from the relational expression "$i_w = -i_u - i_v$". The coordinate converter 12 computes a γ-axis current value iγ and a d-axis current value id by coordinate converting the U-phase current value $i_u$ and the V-phase current value $i_v$ to the current values on the γδ-axes based on the phase θγ from the position/speed estimator 20.

The subtractor 19 refers to the rotation speed ωγ from the position/speed estimator 20 and a rotation speed command value ω* from a rotation speed command value generation unit (not shown) provided either externally or internally to the motor control device 3a, and computes the velocity deviation (ω*−ωγ) between them.

The speed control unit 17 computes and outputs the d-axis current command value id* such that the velocity deviation (ω*−ωγ) converges to zero by utilizing a control such as a proportional-integral control.

The magnetic flux control unit 16 determines the γ-axis current command value iγ*. The γ-axis current command value iγ* may take various values depending on the kind of a vector control performed at the motor drive system and the rotation speed of the motor. Since the dq-axes are estimated in the first embodiment, iγ*=0 if a control is performed to make the d-axis current zero. In addition, if a maximum torque per ampere control and a flux-weakening control are performed, iγ* is a negative value according to id* and/or ωγ (ω*).

The subtractor 13 subtracts the γ-axis current value iγ outputted from the coordinate converter 12 from the γ-axis current command value iγ* outputted by the magnetic flux control unit 16, and computes a current error (iγ*−iγ). The subtractor 14 subtracts the d-axis current value id outputted by the coordinate converter 12 from the d-axis current command value id* outputted from the speed control unit 17, and computes a current error (id*−id).

The current control unit 15 performs a current feedback control utilizing for example a proportional-integral control such that the current errors (iγ*−iγ) and (id*−id) both converge to zero. In this instance, the γ-axis voltage command value vγ* and the d-axis voltage command value vd* are computed such that the current errors (iγ*−iγ) and (id*−id) both converge to zero by utilizing a non-interacting control to eliminate interaction between the γ-axis and the d-axis. In addition, ωγ, iγ, and id also are referred to when computing vγ* and vd*.

The high frequency voltage applying unit 21 generates the command values $v_h\gamma^*$ and $v_hd^*$ for applying a high frequency superposed voltage to the motor 1. $v_h\gamma^*$ and $v_hd^*$ generated at the high frequency voltage applying unit 21 are defined by the above equation (A-1). The superposed voltage to be applied by the high frequency voltage applying unit 21 may be a perfect circle or ellipsoidal rotation voltage or an alternating voltage, as described above.

At the adders 22 and 23, $v_h\gamma^*$ and $v_hd^*$ from the high frequency voltage applying unit 21 are added to $v\gamma^*$ and $vd^*$ from the current control unit 15, and the added values ($v\gamma^* + v_h\gamma^*$) and ($vd^* + v_hd^*$) are obtained. ($v\gamma^* + v_h\gamma^*$) and ($vd^* + v_hd^*$) respectively represent the γ-axis component and the d-axis component of the voltage in which the superposed voltage is added to the drive voltage.

The coordinate converter 18 computes and outputs three-phase voltage command values by coordinate converting the output values ($v\gamma^* + v_h\gamma^*$) and ($vd^* + v_hd^*$) of the adders 22 and 23 onto the three-phase fixed coordinate axes based on the phase θγ from the position/speed estimator 20. The three-phase voltage command values are composed of the U-phase, V-phase, and W-phase voltage command values $v_u^*$, $v_v^*$, and $v_w^*$ that specify the U-phase, V-phase, and W-phase voltage values $v_u$, $v_v$, and $v_w$.

The inverter 2 drives the motor 1 by supplying the motor current $I_a$ according to the three-phase voltage command values such that the actual U-phase, V-phase, and W-phase voltage values $v_u$, $v_v$, and $v_w$ coincide with the U-phase, V-phase, and W-phase voltage command values $v_u^*$, $v_v^*$, and $v_w^*$ respectively.

Figure 14:
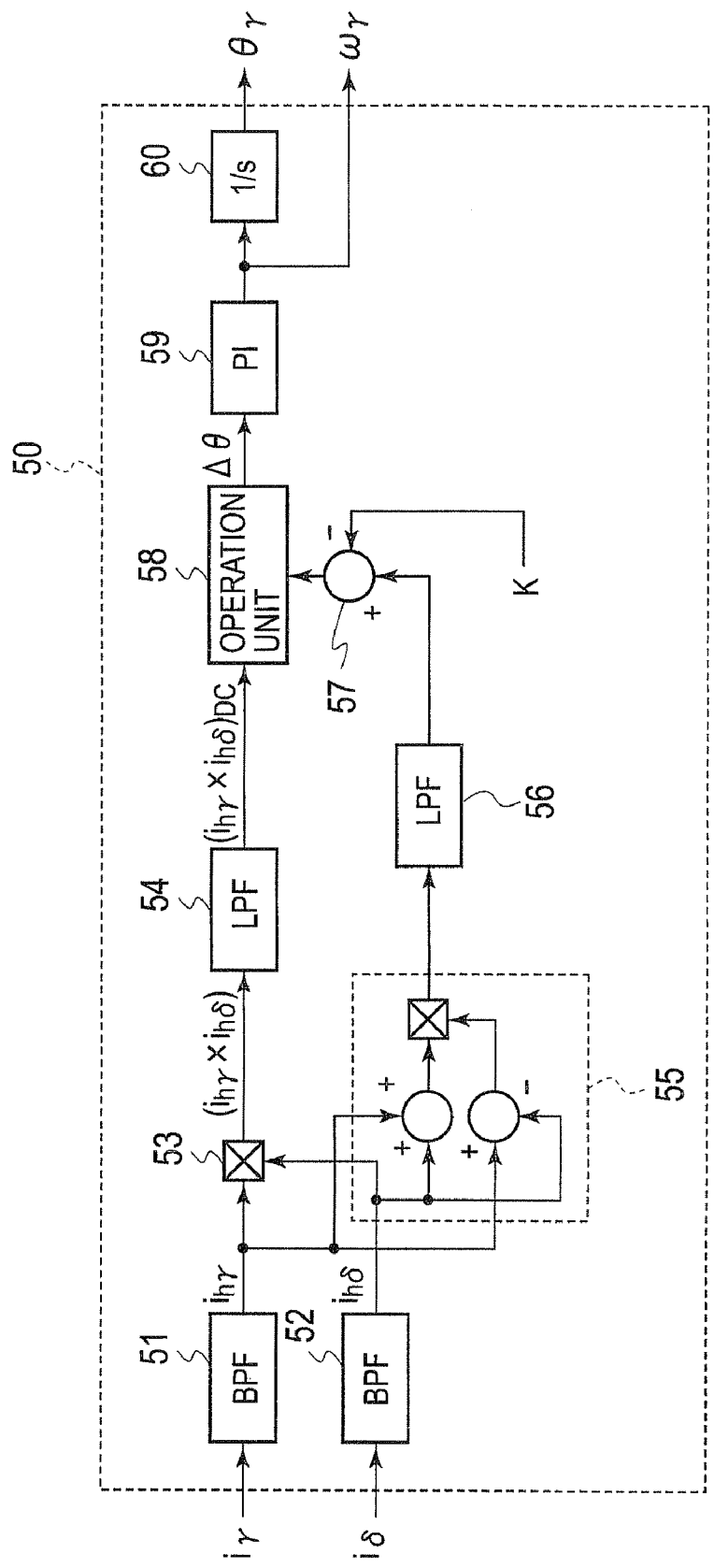
FIG. 14 is a block diagram of an estimation processing unit of the position/speed estimator of FIG. 13.

FIG. 14 shows a block diagram of an estimation processing unit 50 that is part of the position/speed estimator 20. The estimation processing unit 50 includes each unit referred to by reference numbers 51 to 60, and computes the axial error Δθ and the phase θγ (that is, estimates the magnetic pole position) according to the "estimation method based on four axis current components".

The BPF (bandpass filter) 51 receives the γ-axis current value iγ outputted successively by the coordinate converter 12, and extracts the γ-axis component of the superposed current $i_h\gamma$ by extracting a frequency $\omega_h$ signal component of the superposed voltage from the signal having iγ as its signal value. Similarly, the BPF 52 receives the d-axis current value id outputted successively by the coordinate converter 12, and extracts the d-axis component of the superposed current $i_hd$ by extracting a frequency $\omega_h$ signal component of the superposed voltage from the signal having id as its signal value. The multiplier 53 computes a product of $i_h\gamma$ and $i_hd$ extracted by the BPF 51 and 52, i.e. ($i_h\gamma \times i_hd$). The LPF (Low Pass Filter) 54 extracts and outputs the direct current component of the product ($i_h\gamma \times i_hd$), i.e. ($i_h\gamma \times i_hd$)$_{DC}$, by removing the high frequency component from this product ($i_h\gamma \times i_hd$). The high frequency component removed by the LPF 54 is a frequency component including the frequency $\omega_h$ other than the direct current component. The same thing applies to the high frequency components removed by the LPF 56 and the LPF 74 and 76 (see FIG. 17), which will be described below.

The operation unit 55 is a unit that computes the product ($i_{ch}\gamma \times i_{ch}d$). FIG. 14 shows that within the operation unit 55 a sum and a difference of $i_h\gamma$ and $i_hd$ are obtained and then a product of the sum and the difference ($i_h\gamma + i_hd$)·($i_h\gamma - i_hd$) is obtained. The LPF 56 extracts and outputs the direct current component of the product ($i_h\gamma + i_hd$)·($i_h\gamma - i_hd$), i.e. (($i_h\gamma + i_hd$)·($i_h\gamma - i_hd$))$_{DC}$, by removing the high frequency component from this product ($i_h\gamma + i_hd$)·($i_h\gamma - i_hd$).

While it is different from the example shown in FIG. 14, ($i_h\gamma^2 - i_hd^2$) may be computed instead at the operation unit 55 based on the output values $i_h\gamma$ and $i_hd$ of the BPF 51 and 52. In this case, the LPF 56 extracts and outputs the direct current component of ($i_h\gamma^2 - i_hd^2$), i.e. ($i_h\gamma^2 - i_hd^2$)$_{DC}$, by removing the high frequency component from ($i_h\gamma^2 - i_hd^2$). As can be understood from the above equation (B-7), the product of the orthogonal two-axes components ($i_{ch}\gamma \times i_{ch}d$) regarding the γ'-axis and the d'-axis is computed by computing the product ($i_h\gamma + i_hd$)·($i_h\gamma - i_hd$) or the value ($i_h\gamma^2 - i_hd^2$) (to be exact, 2 ($i_{ch}\gamma \times i_{ch}d$) is computed).

The subtractor 57 subtracts the coefficient K from the output value of the LPF 56 and outputs its subtraction result to the operation unit 58. The coefficient K is double the above coefficient $K_0$. In addition, if the superposed voltage applied by the high frequency voltage applying unit 21 is a perfect circle rotation voltage, the coefficient $K_0$ becomes zero as described above, and thus the subtraction process by the subtractor 57 is unnecessary.

The operation unit 58 computes the axial error Δθ according to the above equations (B-12) to (B-14) or computes the axial error Δθ according to the above equations (B-15) to (B-17) based on the output value of the LPF 54 ($i_h\gamma \times i_hd$)$_{DC}$ and the output value of the subtractor 57 which corresponds to $2 \times ((i_{ch}\gamma \times i_{ch}d)_{DC} - K_0)$. The proportional-integral (PI) control unit 59 performs a proportional-integral control so as to achieve a PLL (Phase Locked Loop) control and computes the rotation speed ωγ such that the axial error Δθ outputted by the operation unit 58 converges to zero. The integrator 60 computes the phase θγ by integrating the rotation speed ωγ outputted by the proportional-integral control unit 59. ωγ and θγ computed here are given to each unit of the motor control device 3a that requires these values as the output values of the position/speed estimator 20.

Since the axial error Δθ is brought towards zero by the PLL control in the motor control device 3a according to the first embodiment, the γ-axis follows the d-axis as an estimated axis of the d-axis. The magnetic pole position in the range of −p/2 to p/2 is estimated by the computation of θγ at the estimation processing unit 50 of FIG. 14, but if the magnetic pole position in the range of −p top needs to be estimated, it is only necessary to provide a polar character determination unit (not shown) separately. The polar character determination unit for example determines whether or not to add p to the output value of the integrator 60 by utilizing current information from the detection result of the phase current sensor 11 or utilizing at least one Hall sensor, and only when it is necessary, adds p to the output value of the integrator 60 and outputs the addition result as the eventual phase θγ from the position/speed estimator 20.

Figure 15A:
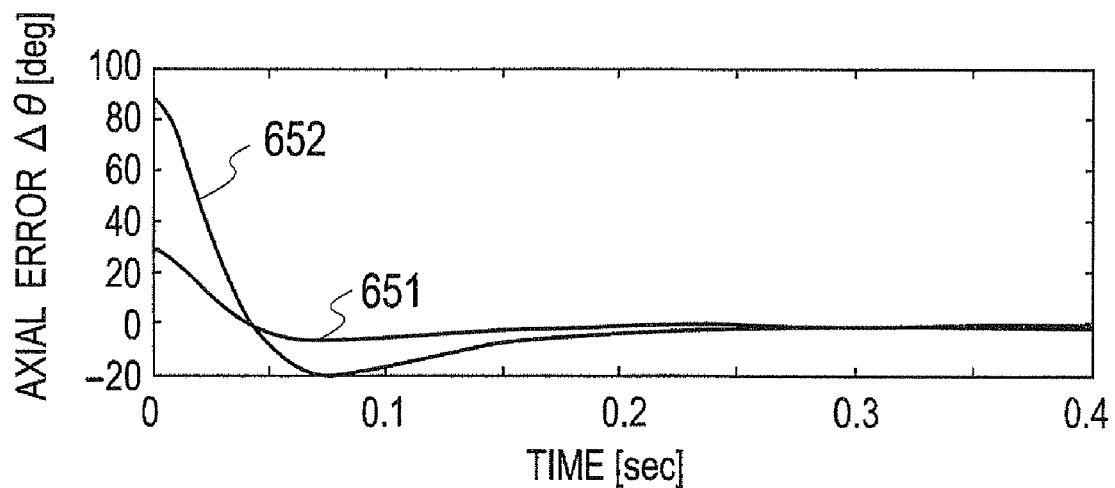
FIGS. 15A and 15B are diagrams concerning the first embodiment of the present invention showing simulation results of axial error estimation.
Figure 15B:
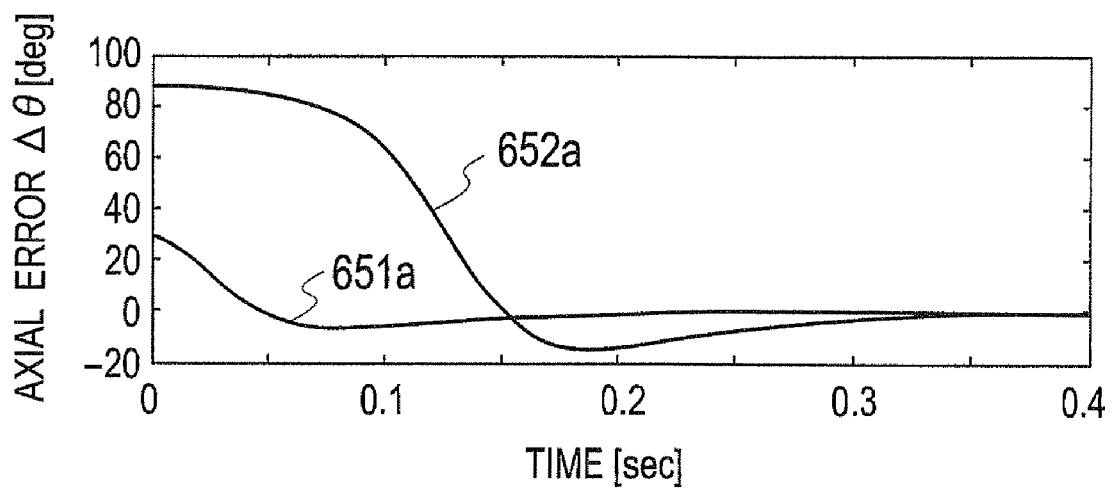

FIG. 15A shows a simulation result concerning convergence of the axial error Δθ utilizing the motor drive system of the first embodiment. FIG. 15B is a reference simulation result to be compared with FIG. 15A. In FIGS. 15A and 15B, the horizontal axes represent time (the unit is second), and the vertical axes represent the axial error Δθ (the unit is degree in electric angle). The curved lines 651 and 652 of FIG. 15A both represent time variations of the axial error Δθ computed by the estimation processing unit 50. On the other hand, the curved lines 651a and 652a of FIG. 15B represent time variations of the axial error Δθ computed by a reference estimation method. In the reference estimation method, rather than utilizing the estimation processing unit 50, the axial error Δθ was estimated by substituting ($i_h\gamma \times i_hd$)$_{DC}$ in the equation obtained by substituting the approximations "sin(2Δθ)≈2Δθ" and "sin(4Δθ)≈4Δθ" in the above equation (B-5). However, for the simulation corresponding to the curved lines 651 and 651a, the initial axial error Δθ was set to be 30°, whereas for the simulation corresponding to the curved lines 652 and 652a, the initial axial error Δθ was set to be 90°.

As can be understood from the comparison of FIG. 15A and FIG. 15B, according to the "estimation method based on four axis current components" of the present invention, even in a case where the initial axial error $\Delta\theta$ is relatively large, the axial error $\Delta\theta$ converges to zero in a short time (that is, it becomes possible to estimate the magnetic pole position $\theta\gamma$ in a short time). Also, as will be explained in another embodiment (including the fourth embodiment) described below, it is possible to treat the magnetic pole position estimated by the "estimation method based on four axis current components" as the initial magnetic pole position, and subsequently estimate the magnetic pole position without utilizing application of the high frequency superposed voltage while being based on that initial magnetic pole position. If the estimation of the initial magnetic pole position can be completed in a short time, it becomes possible to shorten the time during which the high frequency superposed voltage is applied. As a result, it becomes possible to shorten the time period of an occurrence of noise originating from the application of the high frequency superposed voltage.

The estimation of the magnetic pole position without utilizing application of the high frequency superposed voltage is performed based on i$\gamma$, id, v$\gamma$*, and vd* for example. Although v$\gamma$* and vd* are not inputted to the estimation processing unit 50 of FIG. 14, considering that the estimation of the magnetic pole position without utilizing application of the high frequency superposed voltage at the position/speed estimator 20, the aspect that i$\gamma$, id, v$\gamma$*, and vd* are entered to the position/speed estimator 20 is shown in FIG. 13 (the same thing applies to such as FIG. 16 which will be described below).

Second Embodiment

Figure 16:
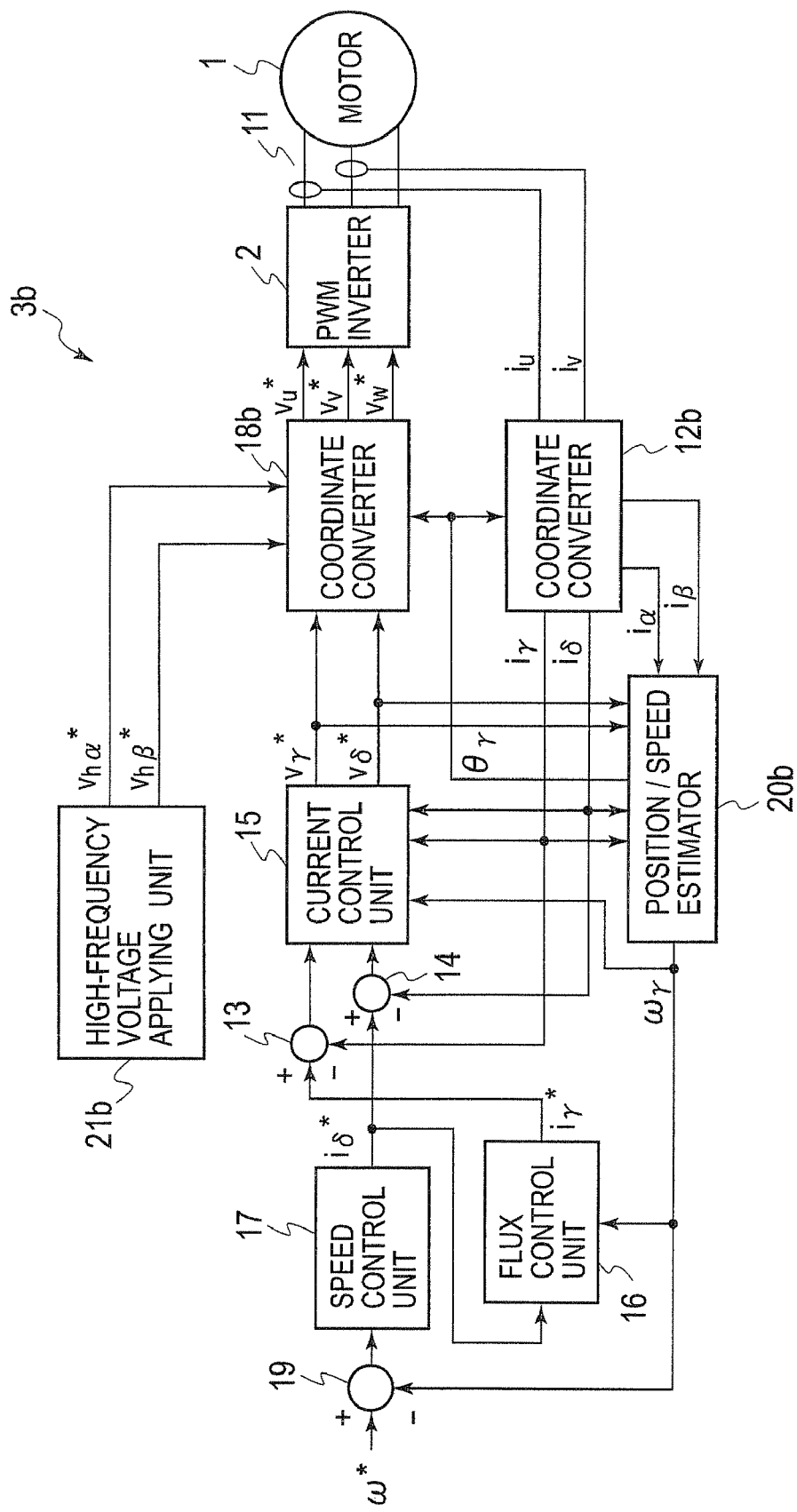
FIG. 16 is a block diagram of the motor drive system according to a second embodiment of the present invention.

Now, a second embodiment of the invention will be explained. FIG. 16 is an internal block diagram of a motor drive system according to the second embodiment. The motor drive system of FIG. 16 includes the motor 1 and the inverter 2 of FIG. 1, as well as a motor control device 3b and the phase current sensor 11. The motor control device 3b may be utilized as the motor control device 3 of FIG. 1. The motor control device 3b includes each unit referred to by reference numbers 12b, 13 to 17, 18b, 19, 20b, and 21b. It also may be considered that the phase current sensor 11 is included in the motor control device 3b. Each unit within the motor control device 3b can utilize freely each value generated within the motor control device 3b.

Similarly to the first embodiment, the motor control device 3b performs a vector control of the motor 1 such that the axial error $\Delta\theta$ converges to zero. Therefore, in the second embodiment, the $\gamma$-axis, which is an estimated axis for control, is made to coincide with the d-axis corresponding to the magnetic pole position (in other words, the dq-axes are estimated).

Operations of each unit referred to by the reference numbers 11, 13-17, and 19 are the same as those explained in the first embodiment. However, in the second embodiment, the rotation speed $\omega\gamma$ that is entered to the current control unit 15, the magnetic flux control unit 16, and the subtractor 19 is given by the position/speed estimator 20b. The differences with the first embodiment will be explained below.

The position/speed estimator 20b computes the phase $\theta\gamma$ as the estimated magnetic pole position (that is, estimates the magnetic pole position), and also computes the rotation speed $\omega\gamma$ (that is, estimates the rotation speed of the motor 1). Methods for these computations will be described below.

The coordinate converter 12b computes the a-axis current value ia and the $\beta$-axis current value i$\beta$ by coordinate conversion of the U-phase current value $i_u$ and the V-phase current value $i_v$ to the current values on the a$\beta$-axes, and computes the $\gamma$-axis current value i$\gamma$ and the d-axis current value id by coordinate conversion of the current value ia and the current value i$\beta$ (or $i_u$ and $i_v$) to the current values on the $\gamma\delta$-axes based on the phase $\theta\gamma$ from the position/speed estimator 20b.

The high frequency voltage applying unit 21b generates the command values $v_h a$* and $v_h \beta$* for applying a high frequency superposed voltage to the motor 1. $v_h a$* and $v_h \beta$* generated at the high frequency voltage applying unit 21b are defined by the above equation (C-1). The superposed voltage to be applied by the high frequency voltage applying unit 21b may be a perfect circle or ellipsoidal rotation voltage or an alternating voltage, as described above.

The coordinate converter 18b computes and outputs three-phase voltage command values ($v_u$*, $v_v$*, and $v_w$*) by coordinate converting v$\gamma$*, vd*, $v_h a$*, and $v_h \beta$* onto the three-phase fixed coordinate axes based on v$\gamma$* and vd* from the current control unit 15, $v_h a$* and $v_h \beta$* from the high frequency voltage applying unit 21b, and the phase $\theta\gamma$ from the position/speed estimator 20b. To be more precise, once the command values va* and v$\beta$* on the a$\beta$-axes that are target values of the a-axis voltage va and the $\beta$-axis voltage v$\beta$ are computed by coordinate converting the command values v$\gamma$* and vd* on the $\gamma\delta$-axes onto the a$\beta$-axes based on the phase $\theta\gamma$, and then added values (va*+$v_h a$*) and (v$\beta$*+$v_h \beta$*) are obtained by adding the command values $v_h a$* and $v_h \beta$* of the superposed voltage to the computed command values va* and v$\beta$*. (va*+$v_h a$*) and (v$\beta$*+$v_h \beta$*) represent the a-axis component and the $\beta$-axis component of the voltage in which the superposed voltage is added to the drive voltage. Thereafter, there-phase voltage command values are computed and outputted by coordinate converting the command values (va*+$v_h a$*) and (v$\beta$*+$v_h \beta$*) on the a$\beta$-axes onto the three-phase fixed axes.

The inverter 2 drives the motor 1 by supplying the motor current $I_a$ according to the three-phase voltage command values such that the actual U-phase, V-phase, and W-phase voltage values $v_u$, $v_v$, and $v_w$ coincide with the U-phase, V-phase, and W-phase voltage command values $v_u$*, $v_v$*, and $v_w$* respectively.

Figure 17:
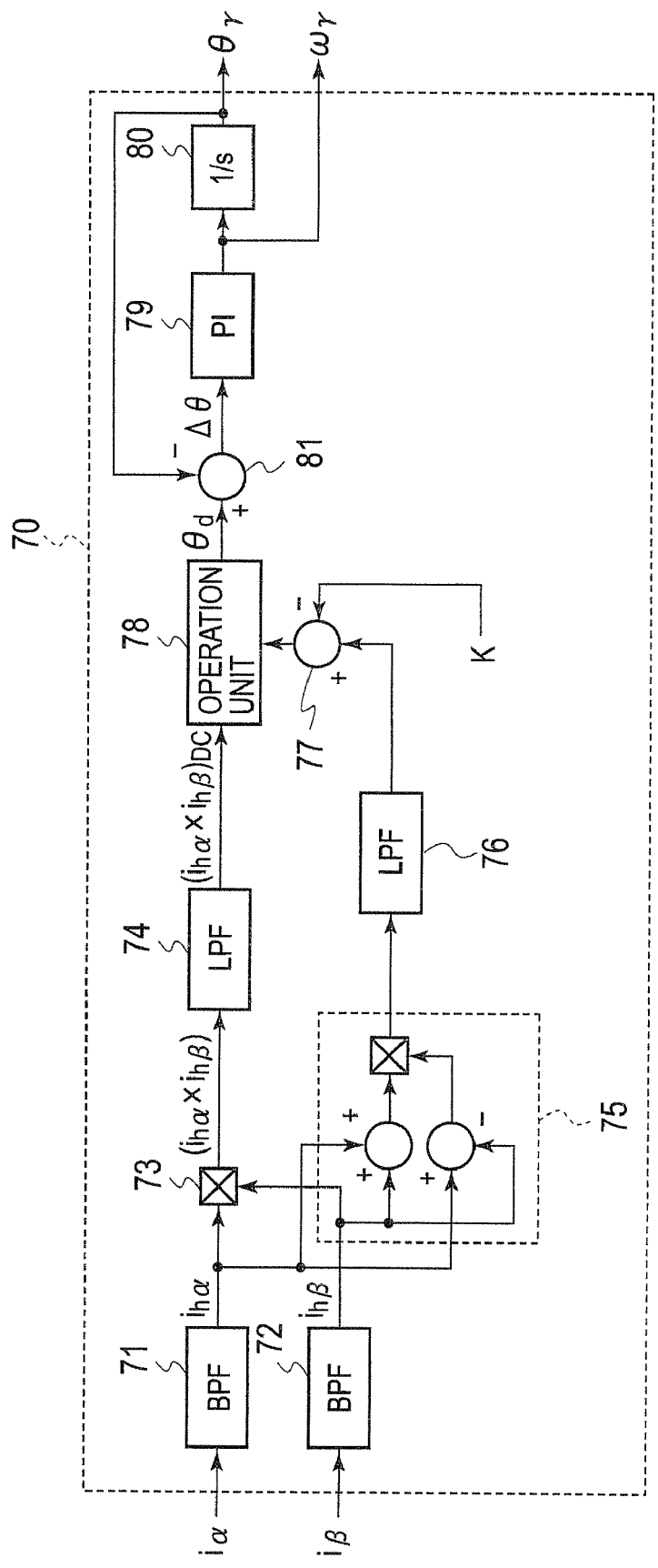
FIG. 17 is a block diagram of an estimation processing unit of the position/speed estimator of FIG. 16.

FIG. 17 shows a block diagram of an estimation processing unit 70 in the position/speed estimator 20b. The estimation processing unit 70 includes each unit referred to by reference numbers 71 to 81, and computes the phase $\theta\gamma$ (that is, estimates the magnetic pole position) according to the "estimation method based on four axis current components". Functions of the units referred to by the reference numbers 71-77, 79 and 80 are the same as the functions of the units referred to by the numbers 51 to 57, 59, and 60 of FIG. 14. However, the estimation processing unit 50 of FIG. 14 carries out an operation based on current information on the $\gamma\delta$-axes, whereas the estimation processing unit 70 of FIG. 17 carries out an operation based on current information on the a$\beta$-axes.

The BPF 71 receives the a-axis current value ia outputted successively by the coordinate converter 12b, and extracts the a-axis component of the superposed current $i_h a$ by extracting a frequency $\omega_h$ signal component of the superposed voltage from the signal having ia as its signal value. Similarly, the BPF 72 receives the $\beta$-axis current value i$\beta$ outputted successively by the coordinate converter 12b, and extracts the $\beta$-axis component of the superposed current $i_h \beta$ by extracting a frequency $\omega_h$ signal component of the superposed voltage from the signal having i$\beta$ as its signal value. The multiplier 73 computes a product of $i_h a$ and $i_h \beta$ extracted by the BPF 71 and 72, i.e. ($i_h a \times i_h \beta$). The LPF 74 extracts and outputs the direct current component of the product $(i_ha \times i_h\beta)$, i.e. $(i_ha \times i_h\beta)_{DC}$, by removing the high frequency component from this product $(i_ha \times i_h\beta)$.

The operation unit 75 is a unit that computes the product $(i_{ch}a \times i_{ch}\beta)$. FIG. 17 shows the aspect that within the operation unit 75 a sum and a difference of $i_ha$ and $i_h\beta$ are obtained and then a product of the sum and the difference $(i_ha+i_h\beta) \cdot (i_ha-i_h\beta)$ is obtained. The LPF 76 extracts and outputs the direct current component of the product $(i_ha+i_h\beta) \cdot (i_ha-i_h\beta)$, i.e. $((i_ha+i_h\beta) \cdot (i_ha-i_h\beta))_{DC}$, by removing the high frequency component from this product $(i_ha+i_h\beta) \cdot (i_ha-i_h\beta)$.

While it is different from the example shown in FIG. 17, $(i_ha^2-i_h\beta^2)$ may be computed instead at the operation unit 55 based on the output values $i_ha$ and $i_h\beta$ of the BPF 71 and 72. In this case, the LPF 76 extracts and outputs the direct current component of $(i_ha^2-i_h\beta^2)$, i.e. $(i_ha^2-i_h\beta^2)_{DC}$, by removing the high frequency component from $(i_ha^2-i_h\beta^2)$. As can be understood from the above equation (C-3), the product of the orthogonal two-axes components $(i_{ch}a \times i_{ch}\beta)$ regarding the a'-axis and the β'-axis is computed by computing the product $(i_ha+i_h\beta) \cdot (i_ha-i_h\beta)$ or the value $(i_ha^2-i_h\beta^2)$ (to be exact, $2(i_{ch}a \times i_{ch}\beta)$ is computed).

The subtractor 77 subtracts the coefficient K from the output value of the LPF 76 and outputs its subtraction result to the operation unit 78. The coefficient K is double the above coefficient $K_0$. In addition, if the superposed voltage applied by the high frequency voltage applying unit 21b is a perfect circle rotation voltage, the coefficient $K_0$ becomes zero as described above, and thus the subtraction process by the subtractor 77 is unnecessary.

The operation unit 78 computes the phase $\theta_d$ according to the above equations (C-6) to (C-8) or computes the phase $\theta_d$ according to the above equations (C-9) to (C-11) based on the output value of the LPF 74 $(i_ha \times i_h\beta)_{DC}$ and the output value of the subtractor 77 which corresponds to $2 \times ((i_{ch}a \times i_{ch}\beta)_{DC} - K_0)$. The subtractor 81 computes the axial error Δθ by subtracting the phase θγ outputted by the integrator 80 from the phase $\theta_d$ computed at the operation unit 78. The proportional-integral control unit 79 performs a proportional-integral control so as to achieve a PLL control and computes the rotation speed ωγ such that the axial error Δθ outputted by the subtractor 81 converges to zero. The integrator 80 computes the phase θγ by integrating the rotation speed ωγ outputted by the proportional-integral control unit 79. ωγ and θγ computed here are given to each unit of the motor control device 3b that requires these values as the output values of the position/speed estimator 20b.

Since the axial error Δθ is brought towards zero by the PLL control in the motor control device 3b according to the second embodiment, the γ-axis follows the d-axis as an estimated axis of the d-axis. The magnetic pole position in the range of −p/2 to p/2 is estimated by the computation of θγ at the estimation processing unit 70 of FIG. 17, but if the magnetic pole position in the range of −p to p needs to be estimated, it is only necessary to provide a polar character determination unit (not shown) separately. The polar character determination unit for example determines whether or not to add p to the output value of the integrator 80 by utilizing current information from the detection result of the phase current sensor 11 or utilizing at least one Hall sensor, and only when it is necessary, adds p to the output value of the integrator 80 and outputs the addition result as the eventual phase θγ from the position/speed estimator 20b.

Effects similar to the first embodiment can be achieved by forming the motor drive system as described in the second embodiment.

Third Embodiment

Figure 18:
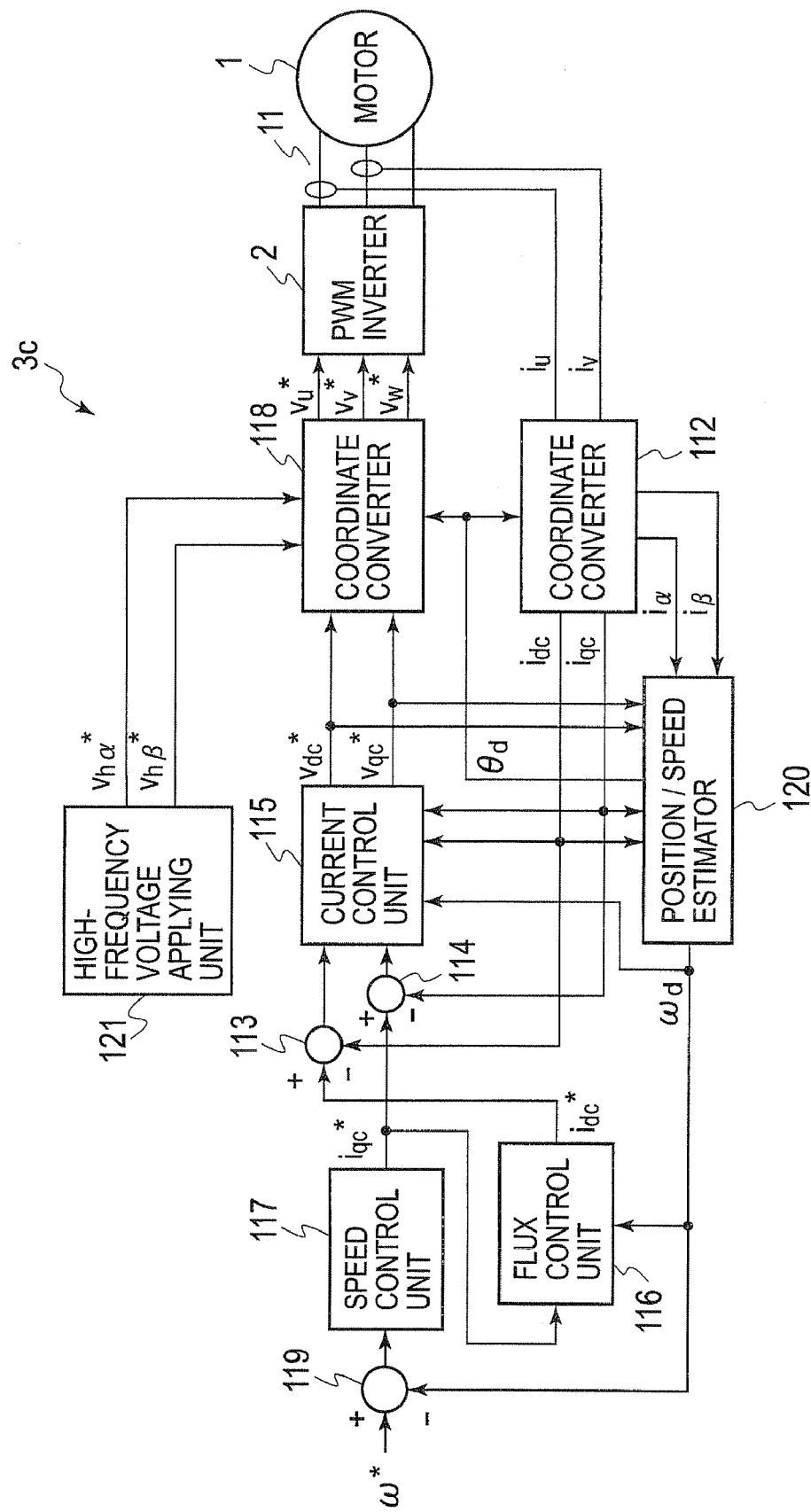
FIG. 18 is a block diagram of the motor drive system according to a third embodiment of the present invention.

Now, a third embodiment of the invention will be described. FIG. 18 is a block diagram of a motor drive system according to the third embodiment. The motor drive system of FIG. 18 includes the motor 1 and the inverter 2 of FIG. 1, as well as a motor control device 3c and the phase current sensor 11. The motor control device 3c may be utilized as the motor control device 3 of FIG. 1. The motor control device 3c includes each unit referred to by reference numbers 112 to 121. It also may be considered that the phase current sensor 11 is included in the motor control device 3c. Each unit within the motor control device 3c can utilize freely each value generated within the motor control device 3c.

Unlike in the first and second embodiments, the motor control device 3c estimates the magnetic pole position directly without making the axial error Δθ converge to zero.

The position/speed estimator 120 computes the phase $\theta_d$ representing the magnetic pole position (that is, estimates the magnetic pole position), and also computes the rotation speed $\omega_d$ (that is, estimates the rotation speed of the motor 1). Methods for these computations will be described below.

The coordinate converter 112 computes the a-axis current value ia and the β-axis current value iβ by coordinate conversion of the U-phase current value $i_u$ and the V-phase current value $i_v$ to the current values on the aβ-axes, and computes the dc-axis current value $i_{dc}$ and the qc-axis current value $i_{qc}$ by coordinate conversion of the current value ia and the current value iβ (or $i_u$ and $i_v$) to the current values on the dcqc-axes based on the phase $\theta_d$ from the position/speed estimator 120.

Figure 19:
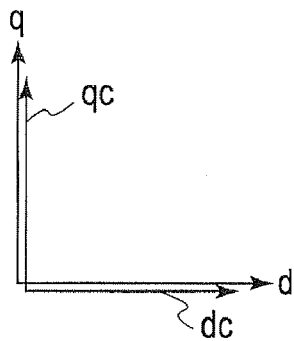
FIG. 19 is a diagram concerning the third embodiment of the present invention showing a phase relationship of the d-axis, the q-axis, the dc-axis, and the qc-axis.

The dc-axis and the qc-axis are estimated axes for the d-axis and q-axis, and if the phase $\theta_d$ computed by the position/speed estimator 120 coincides with the true phase $\theta_d$, the dc-axis and the qc-axis coincide with the d-axis and the q-axis respectively, as shown in FIG. 19. The dc-axis and the qc-axis will be called dcqc-axes collectively. In the third embodiment, a current vector control is performed on the dcqc-axes.

The dc-axis component and the qc-axis component of the motor voltage $V_a$ will be called a dc-axis voltage and a qc-axis voltage respectively, and will be represented by the symbols $v_{dc}$ and $v_{qc}$. The dc-axis component and the qc-axis component of the motor current $I_a$ will be called a dc-axis current and a qc-axis current respectively, and will be represented by the symbols $i_{dc}$ and $i_{qc}$.

Target values for the dc-axis voltage $v_{dc}$ and the qc-axis voltage $v_{qc}$ that the dc-axis voltage $v_{dc}$ and the qc-axis voltage $v_q$ are to follow are represented by a dc-axis voltage command value $v_{dc}{}^*$ and a qc-axis voltage command value $v_{qc}{}^*$ respectively. Target values for the dc-axis current $i_{dc}$ and the qc-axis current $i_{qc}$ that the dc-axis current $i_{dc}$ and the qc-axis current $i_q$ are to follow are represented by a dc-axis current command value $i_{dc}{}^*$ and a qc-axis current command value $i_{qc}{}^*$ respectively.

The subtractor 119 refers to the rotation speed $\omega_d$ from the position/speed estimator 120 and the rotation speed command value ω* from a rotation speed command value generation unit (not shown) provided either externally or internally to the motor control device 3c, and computes the velocity deviation $(\omega^* - \omega_d)$ between them.

The speed control unit 117 computes the qc-axis current command value $i_{qc}{}^*$ such that the velocity deviation $(\omega^* - \omega_d)$ converges to zero by utilizing such as a proportional-integral control and outputs it. The magnetic flux control unit 116 determines the dc-axis current command value $i_{dc}{}^*$. A determination method of $i_{dc}{}^*$ by the magnetic flux control unit 116 is the same as the determination method of iγ* by the magnetic flux control unit 16.

The current control unit 115 performs a current feedback control utilizing for example a proportional-integral control such that the current errors ($i_{dc}*-i_{dc}$) and ($i_{qc}*-i_{qc}$) computed by the subtractors 113 and 114 both converge to zero. On this occasion, the dc-axis voltage command value $v_{dc}*$ and the qc-axis voltage command value $v_{qc}*$ are computed such that the current errors ($i_{dc}*-i_{dc}$) and ($i_{qc}*-i_{qc}$) both converge to zero by utilizing a non-interacting control to eliminate interaction between the dc-axis and the qc-axis. In addition, $\omega_d$, $i_{dc}$, and $i_{qc}$ also are referred to when computing $v_{dc}*$ and $v_{qc}*$.

The high frequency voltage applying unit 121 generates the command values $v_ha*$ and $v_h\beta*$ for applying a high frequency superposed voltage to the motor 1. $v_ha*$ and $v_h\beta*$ generated at the high frequency voltage applying unit 121 are defined by the above equation (C-1). The superposed voltage to be applied by the high frequency voltage applying unit 121 may be a perfect circle or ellipsoidal rotation voltage or an alternating voltage, as described above.

The coordinate converter 118 computes and outputs three-phase voltage command values ($v_u*$, $v_v*$, and $v_w*$) by coordinate converting the command values $v_{dc}*$, $v_{qc}*$, $v_ha*$, and $v_h\beta*$ onto the three-phase fixed coordinate axes based on the phase $\theta_d$ from the position/speed estimator 120, $v_{dc}*$ and $v_{qc}*$ from the current control unit 115, and $v_ha*$ and $v_h\beta*$ from the high frequency voltage applying unit 121. To be more precise, once the command values $va*$ and $v\beta*$ on the $a\beta$-axes that are target values of the a-axis voltage va and the $\beta$-axis voltage $v\beta$ are computed by coordinate converting the command values $v_{dc}*$ and $v_{qc}*$ on the dcqc-axes onto the $a\beta$-axes based on the phase $\theta_d$, and then added values ($va*+v_ha*$) and ($v\beta*+v_h\beta*$) are obtained by adding the command values $v_ha*$ and $v_h\beta*$ of the superposed voltage to the computed command values $va*$ and $v\beta*$. ($va*+v_ha*$) and ($v\beta*+v_h\beta*$) represent the a-axis component and the $\beta$-axis component of the voltage in which the superposed voltage is added to the drive voltage. Thereafter, there-phase voltage command values are computed and outputted by coordinate converting the command values ($va*+v_ha*$) and ($v\beta*+v_h\beta*$) on the $a\beta$-axes onto the three-phase fixed axes.

The inverter 2 drives the motor 1 by supplying the motor current $I_a$ according to the three-phase voltage command values such that the actual U-phase, V-phase, and W-phase voltage values $v_u$, $v_v$, and $v_w$ coincide with the U-phase, V-phase, and W-phase voltage command values $v_u*$, $v_v*$, and $v_w*$ respectively.

Figure 20:
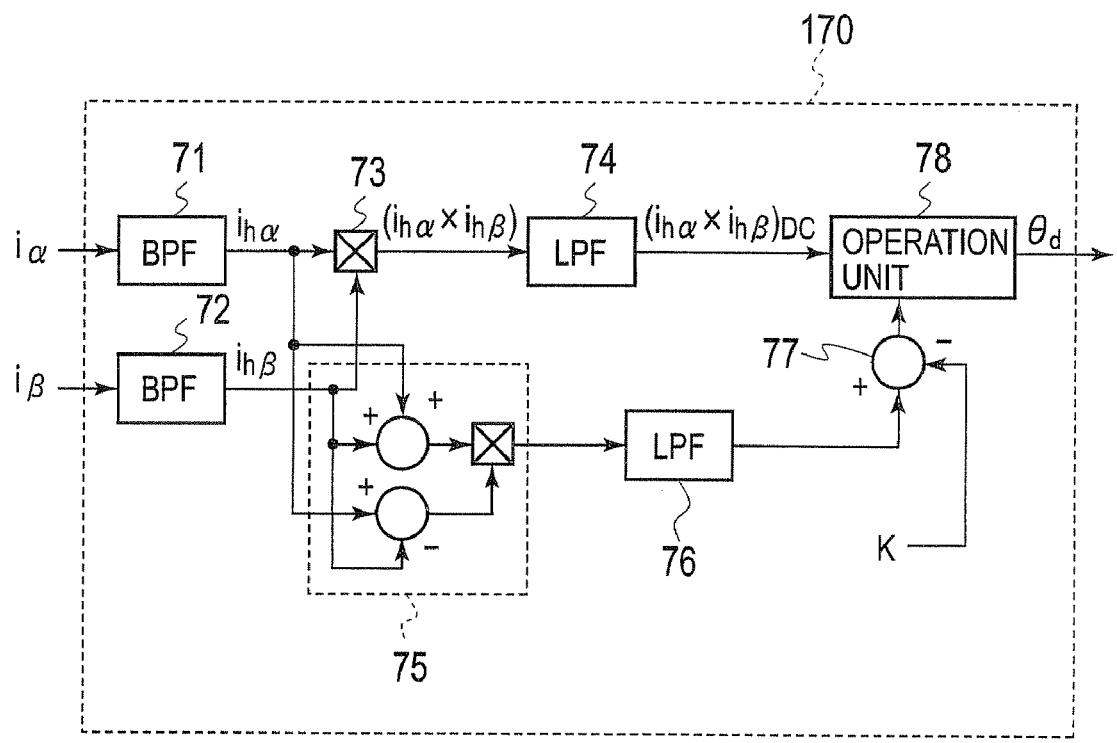
FIG. 20 is a block diagram of an estimation processing unit in the position/speed estimator of FIG. 18.

FIG. 20 shows a block diagram of an estimation processing unit 170 as part of the position/speed estimator 120. The estimation processing unit 170 includes each unit referred to by reference numbers 71 to 78, and computes the magnetic pole position $\theta_d$ (that is, estimates the magnetic pole position) according to the "estimation method based on four axis current components". Functions of the units referred to by the reference numbers 71-78 are the same as those shown in FIG. 17. A computed value of the phase $\theta_d$ is outputted from the operation unit 78 by the units referred to by the reference numbers 71-78 based on the current values $i\alpha$ and $i\beta$ from the coordinate converter 112. The rotation speed $\omega_d$ is computed by differentiating the phase $\theta_d$, and the computed $\omega_d$ and $\theta_d$ are given to each unit of the motor control device 3c that requires the value as output values of the position/speed estimator 120.

Figure 21A:
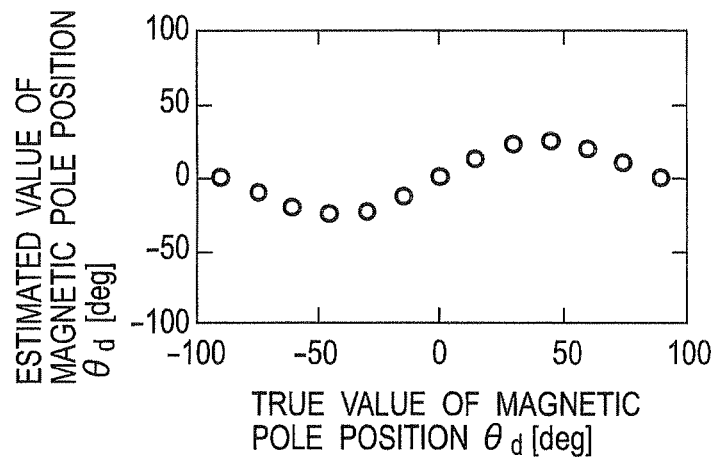
FIGS. 21A and 21B are diagrams concerning the third embodiment of the present invention showing simulation results of magnetic pole position estimation.
Figure 21B:
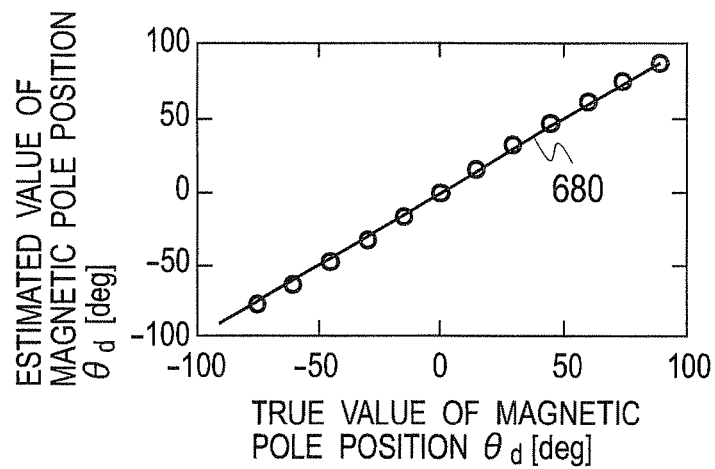

FIGS. 21A and 21B show simulation results concerning magnetic pole position estimation. In FIGS. 21A and 21B, the horizontal axes represent a true value of the magnetic pole position $\theta_d$ (the unit is degree in electric angle), and the vertical axes represent an estimated value of the magnetic pole position $\theta_d$ (the unit is degree in electric angle). The group of white circles in FIG. 21B show magnetic pole positions $\theta_d$ estimated by the estimation processing unit 170 upon treating a true value of the magnetic pole position $\theta_d$ as a variable number. The solid line 680 of FIG. 21B is a line drawn along the group of white circles of FIG. 21B. FIG. 21A is a reference drawing for comparison with FIG. 21B. The group of white circles in FIG. 21A show magnetic pole positions $\theta_d$ estimated by the operation expression "$\theta_d=\frac{1}{2}\cdot\sin((i_h a \times i_h \beta)_{DC})$" upon treating a true value of the magnetic pole position $\theta_d$ as a variable number.

As can be understood from FIG. 21B, the estimated values for the magnetic pole position coincide with true values with high accuracy in the range of $-p/2$ to $p/2$ according to the estimation processing unit 170, and thus, the estimated values can be utilized directly as magnetic pole position information. On the other hand, such utilization is difficult when the magnetic pole position $\theta_d$ is estimated by the operation expression "$\theta_d=\frac{1}{2}\cdot\sin((i_h a \times i_h \beta)_{DC})$".

In practice, a magnetic polar character determination unit (not shown) is provided within the position/speed estimator 120. The polar character determination unit for example determines whether or not to add p to the output value of the operation unit 78 by utilizing current information from the detection result of the phase current sensor 11 or utilizing at least one Hall sensor, and only when it is necessary, adds p to the output value of the operation unit 78 and outputs the addition result as the eventual phase $\theta_d$ from the position/speed estimator 120.

Effects similar to the first embodiment can be achieved by forming the motor drive system as described in the third embodiment. Also, by estimating the magnetic pole position directly without involving the PLL control (proportional-integral control) as in the motor drive system of the third embodiment, it becomes possible to estimate the magnetic pole position distinctly in a short time.

Fourth Embodiment

Figure 22:
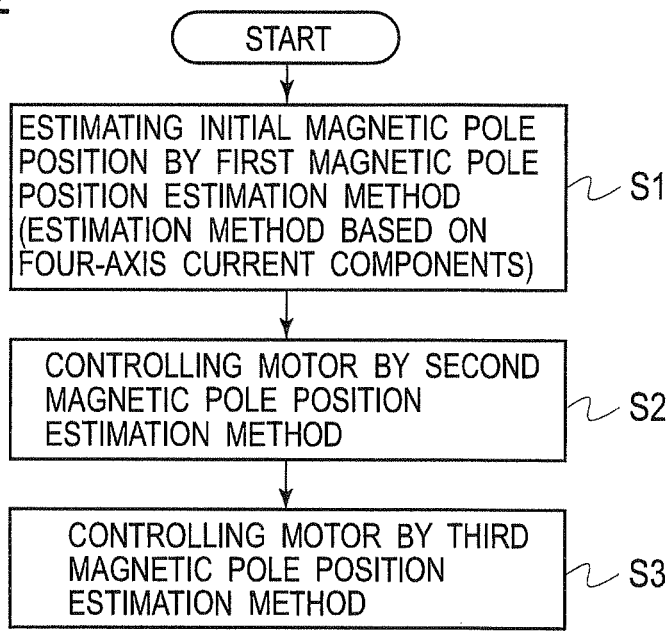
FIG. 22 is an operation flowchart of the motor drive system according to a fourth embodiment of the present invention.

Now a fourth embodiment of the invention will be explained. It is possible to divide a time frame from start of the motor 1 to its high-speed rotation into a plurality of time frames, and perform an estimation process suitable for each of the respective time frames. FIG. 22 is an operation flowchart of the motor drive system according to the fourth embodiment. During the time frame from the state in which rotation of the motor 1 is stopped and the magnetic pole position is unknown to the state of stable high-speed rotation of the motor 1, processes of steps S1, S2, and S3 are carried out sequentially.

At step S1, the initial magnetic pole position is estimated according to a first magnetic pole position estimation method. At step S1, the initial magnetic pole position $\theta_d$ is estimated by the "estimation method based on four axis current components" without performing control such as a current control and a speed control.

At step S2 that follows, the motor 1 is vector controlled by estimating the magnetic pole position according to a second magnetic pole position estimation method based on an estimation result of the magnetic pole position $\theta_d$ by step S1. The second magnetic pole position estimation method may be the "estimation method based on four axis current components" or may be a different method. For example, it may be a method described in Japanese Patent Laid-Open No. 2007-53829, that is, an estimation method of the magnetic pole position utilizing a $\gamma$-axis component and a d-axis component of the superposed current. For the second magnetic pole position estimation method, it is good to adopt a magnetic pole position estimation method with good estimation accuracy at the time of rotation stoppage or low-speed rotation of the motor 1.

Thereafter, once the rotation speed of the motor 1 increases and exceeds a predetermined reference speed, the process moves from step S2 to step S3, and the estimation method of the magnetic pole position switches from the second magnetic pole position estimation method to the third magnetic pole position estimation method. In the third magnetic pole position estimation method, the magnetic pole position is estimated by estimating an induced voltage in the motor 1. Therefore, in the third magnetic pole position estimation method, application of the superposed voltage is unnecessary. In order to shorten the time period of noise originated from the application of the high frequency superposed voltage, the process of step S2 may be omitted and the process may move directly to step S3 after the initial magnetic pole position $\theta_d$ is estimated at step S1.

Figure 23:
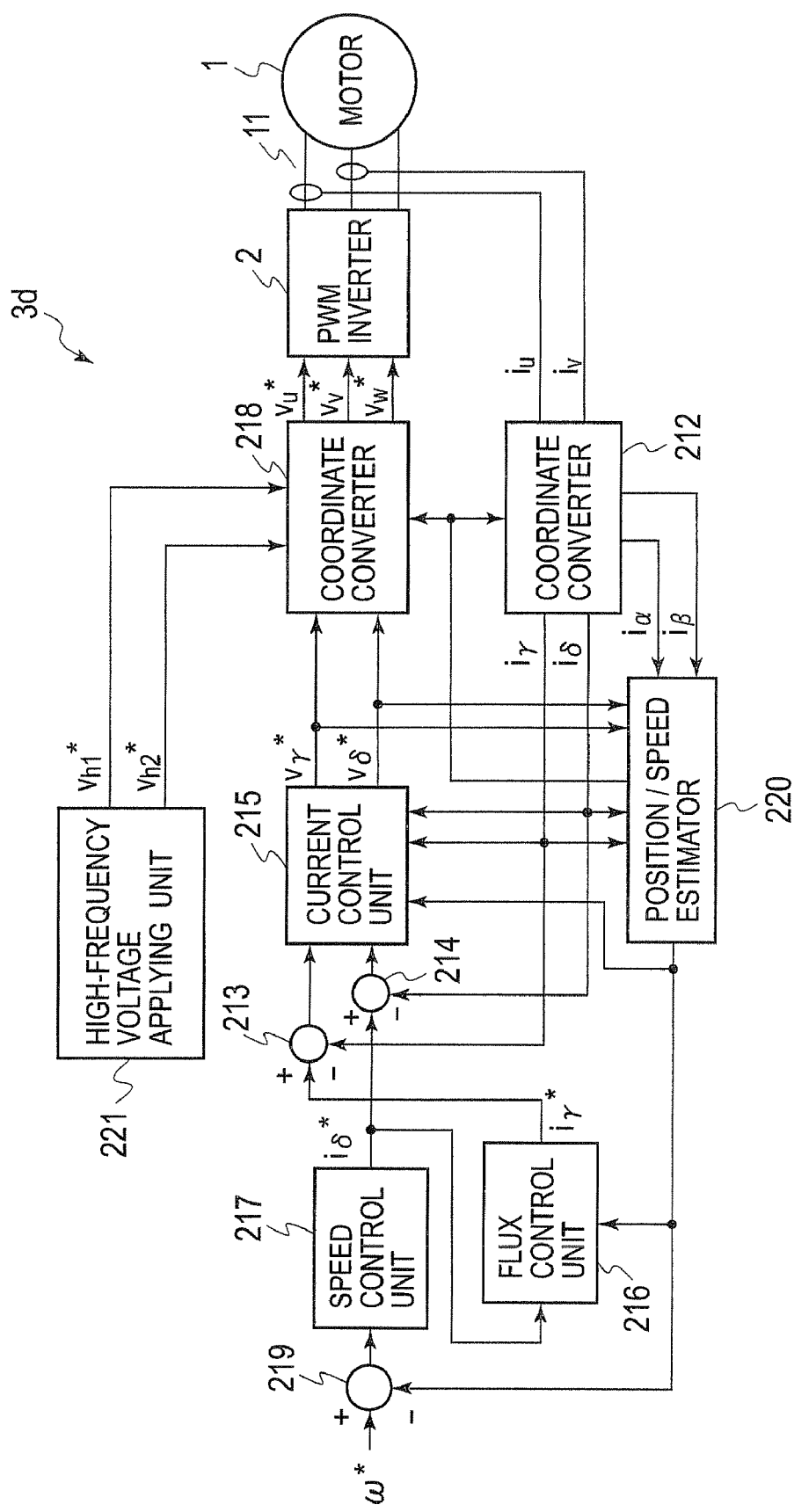
FIG. 23 is a block diagram of the motor drive system according to the fourth embodiment of the present invention.

FIG. 23 shows a specific structural example of the motor drive system that achieves the operations shown in FIG. 22. FIG. 23 is an internal block diagram of a motor drive system according to the fourth embodiment. The motor drive system of FIG. 23 includes the motor 1 and the inverter 2 of FIG. 1, as well as a motor control device 3d and a phase current sensor 11. The motor control device 3d may be utilized as the motor control device 3 of FIG. 1. The motor control device 3d includes each unit referred to by reference numbers 212 to 221. It also may be considered that the phase current sensor 11 is included in the motor control device 3d. Each unit within the motor control device 3d can utilize freely each value generated within the motor control device 3a.

The high frequency voltage applying unit 221 generates command values $v_{h1}*$ and $v_{h2}*$ for a superposed voltage. The meaning of these command values will become apparent by the explanations that are provided below.

When a command signal to start rotation of the motor 1 is inputted to the motor drive system of FIG. 23, the motor control device 3d carries out a process to estimate the initial magnetic pole position at step S1. That is, for example, it causes the position/speed estimator 220 to estimate and compute the phase $\theta_d$ by making the coordinate converters 212, 218, the position/speed estimator 220, and the high frequency voltage applying unit 221 function as the coordinate converters 112, 118, the position/speed estimator 120, and the high frequency voltage applying unit 121 of FIG. 18.

Figure 24:
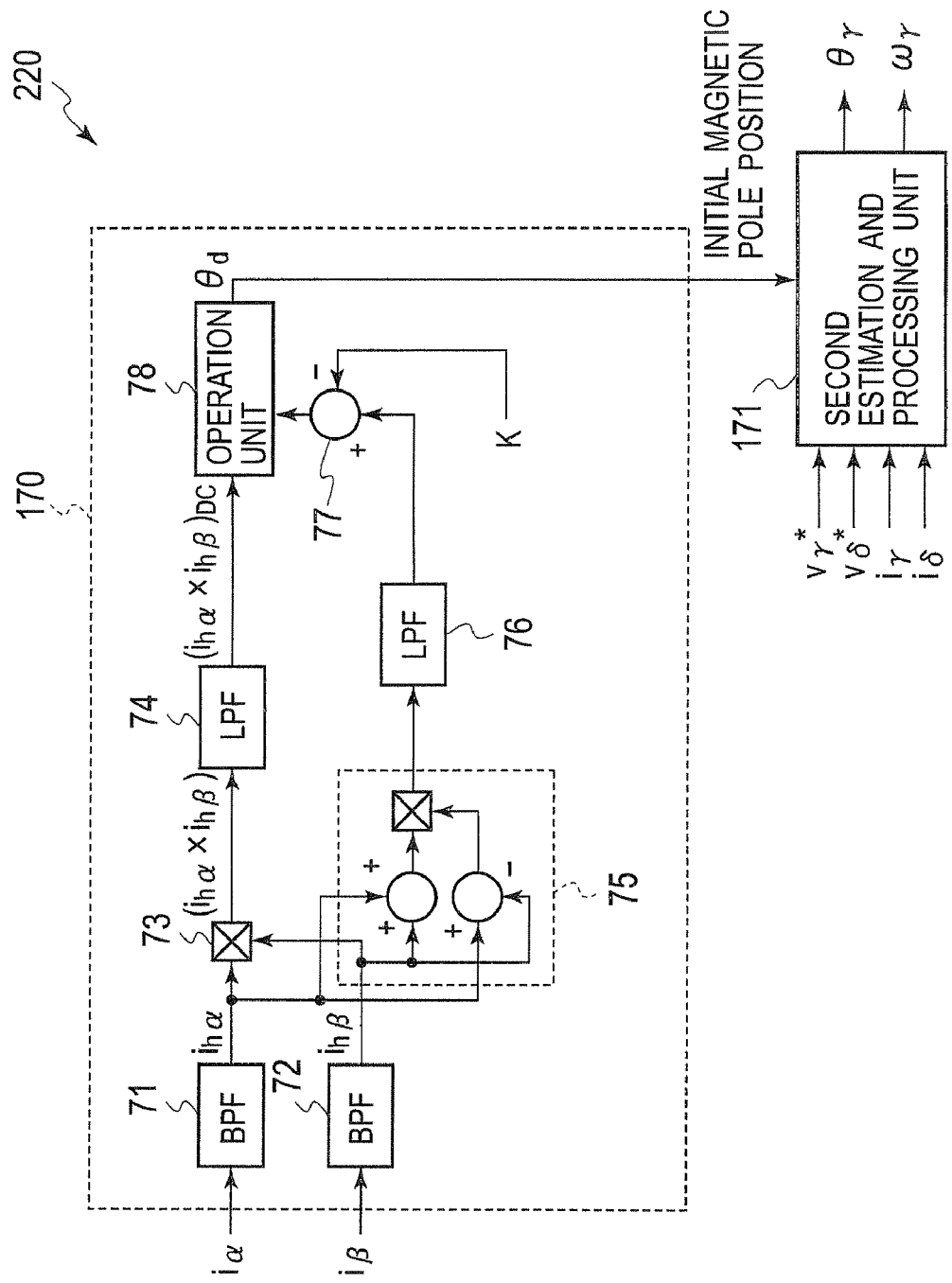
FIG. 24 is a block diagram of the position/speed estimator of FIG. 23.

FIG. 24 shows a block diagram of the position/speed estimator 220. The position/speed estimator 220 includes the estimation processing unit 170 and the second estimation processing unit 171. The estimation processing unit 170 which is intrinsic in the position/speed estimator 220 is the same as that shown in FIG. 20.

To be more precise, the following process is carried out at step S1. At step S1, it is made as $v_{h1}*=va*$ and $v_{h2}*=v\beta*$ such that the superposed voltage as defined by the above equation (C-1) is applied to the motor 1, and at the coordinate converter 218 three-phase voltage command values are computed by coordinate converting the command values on the αβ-axes $v_{h1}*$ (=$va*$) and $v_{h2}*$ (=$v\beta*$) onto the three-phase fixed coordinate axes. The motor current $I_a$ according to these three-phase voltage command values are supplied from the inverter 2 to the motor 1. The coordinate converter 212 computes the current values iα and iβ by coordinate converting the current values $i_u$ and $i_v$ detected at the phase current sensor 11 at the time when the superposed voltage is applied to the current values on the αβ-axes, and gives the computed current values iα and iβ to the estimation processing unit 170 in the position/speed estimator 220. The phase $\theta_d$ computed at the estimation processing unit 170 based on the computed current values iα and iβ at step S1 corresponds to the initial magnetic pole position to be estimated at step S1. At step S1, operations of each unit referred to by the reference numbers 213 to 217 and 219 are stopped.

After the initial magnetic pole position is estimated at step S1, the motor control device 3d starts the motor 1 by carrying out the process of step S2. At step S2, it is made as $v_{h1}*=v_h\gamma*$ and $v_{h2}*=v_h d*$ such that the superposed voltage as defined by the above equation (A-1) is applied to the motor 1. In addition, at step S2, the process makes the second estimation processing unit 171 to estimate the γ-axis phase $\theta\gamma$ and rotation speed $\omega\gamma$ and makes each unit referred to by the reference numbers 212 to 219 within the motor control device 3d to perform operations similar to that of each unit referred to by the reference numbers 12 to 19 of FIG. 13. The second estimation processing unit 171 utilizes the initial magnetic pole position $\theta_d$ estimated by the estimation processing unit 170 at step S1 as the phase $\theta\omega$ at the time of starting the process of step S2. Therefore, estimation of the magnetic pole position can be started from the state in which the axial error $\Delta\theta$ is zero.

To be more precise, the BPF 51, the BPF 52, the multiplier 53, the LPF 54, the proportional-integral control unit 59, and the integrator 60 of FIG. 14 are provided as part of the second estimation processing unit 171. Then, at step S2, $(i_h\gamma \times i_h d)_{DC}$ is computed utilizing the BPF 51, the BPF 52, the multiplier 53, and the LPF 54 based on the γ-axis current value iγ and the d-axis current value id outputted by the coordinate converter 212, and the axial error $\Delta\theta$ is estimated by substituting $(i_h\gamma \times i_h d)_{DC}$ in the equation obtained by substituting the approximations "$\sin(2\Delta\theta) \approx 2\Delta\theta$" and "$\sin(4\Delta\theta) \approx 4\Delta\theta$" in the above equation (B-5). At step S2, the rotation speed $\omega\gamma$ and the phase $\theta\gamma$ are computed through a proportional-integral control to converge this axial error $\Delta\theta$ to zero by the proportional-integral control unit 59 and the integrator 60. At step S2 (and S3), the motor 1 rotates at a desired rotation speed by performing a vector control to make the γ-axis to follow the d-axis by supplying the rotation speed $\omega\gamma$ computed at step S2 (and S3) to the current control unit 215, the magnetic flux control unit 216, and the subtractor 219, and supplying the phase $\theta\gamma$ computed at step S2 (and S3) to the coordinate converters 212 and 218.

In a case that the rotation speed of the motor 1 exceeds a predetermined reference speed, it is possible to carry out the process of step S3 rather than the process of step S2. At step S3, application of the superposed voltage by the high frequency voltage applying unit 221 is stopped (that is, it is made such that $v_{h1}*=v_{h2}*=0$). At step S3, the second estimation processing unit 171 computes the axial error $\Delta\theta$ based on the current values iγ and id from the coordinate converter 212 and command values $v\gamma*$ and $vd*$ from the current control unit 215, and computes the phase $\theta\gamma$ and the rotation speed $\omega\gamma$ by performing a proportional-integral control such that the axial error $\Delta\theta$ converges to zero. As a computation method of the axial error $\Delta\theta$ based on iγ, id, $v\gamma*$, and $vd*$ (computation method of the axial error $\Delta\theta$ through estimation of an induced voltage based on iγ, id, $v\gamma*$, and $vd*$), a known arbitrary method can be adopted. For example, the axial error $\Delta\theta$ can be estimated by the following equation. Note that "s" in the following equation is the Laplace operator, and $E_{ex}\gamma$ and $E_{ex}d$ are a γ-axis component and a d-axis component of an extended induced voltage $E_{ex}$ respectively. The extended induced voltage $E_{ex}$ is expressed by $E_{ex}=\omega\gamma((L_d-L_q)i_d+F_a)-(L_d-L_q)(pi_q)$. Here, "p" is the differential operator.

$$\Delta\theta = \tan^{-1}\left(\frac{-E_{ex\gamma}}{E_{ex\delta}}\right)$$

$$= \tan^{-1}\left(\frac{-(v_\gamma^* - (R_a + L_d s)i_\gamma + \omega_\gamma L_q i_\delta)}{(v_\delta^* - (R_a + L_d s)i_\delta - \omega_\gamma L_q i_\gamma)}\right)$$

As described above, in the motor drive system of FIG. 23, it is possible to omit the process of step S2. In other words, the process may move to step S3 immediately after the initial magnetic pole position $\theta_d$ is estimated at step S1. At this time, the second estimation processing unit 171 utilizes the initial magnetic pole position $\theta_d$ estimated at step S1 as the phase $\theta\gamma$ at the time of starting the process of step S3.

Also, as in the operation example explained with respect to the motor drive system of FIG. 23, in a case that the superposed voltage in the αβ coordinate system is applied at step S1, and estimation of the initial magnetic pole position is performed based on the current values iα and iβ, such as a current control utilizing the current control unit 215 is not performed at step S1. Therefore, the coordinate conversion for converting information on the γδ-axes to information on the αβ-axes and its reverse conversion become unnecessary, and as a result, operation burden can be alleviated.

Fifth Embodiment

Now a fifth embodiment of the invention will be explained. In the process of step S1 performed at the motor drive system of FIG. 23, the superposed voltage on the αβ coordinate system is applied to the motor 1, and the initial magnetic pole position is estimated based on the α-axis component and the β-axis component of the superposed voltage. In other words, direct estimation of the initial magnetic pole position (estimation without using a PLL control) is performed by focusing on the αβ coordinate system in the process of step S1 performed at the motor drive system of FIG. 23. However, the coordinate system to be utilized when directly estimating the initial magnetic pole position may be a coordinate system other than the αβ coordinate system. In the fifth embodiment, a direct estimation method of the initial magnetic pole position focusing on the γδ coordinate system will be explained.

Figure 25:
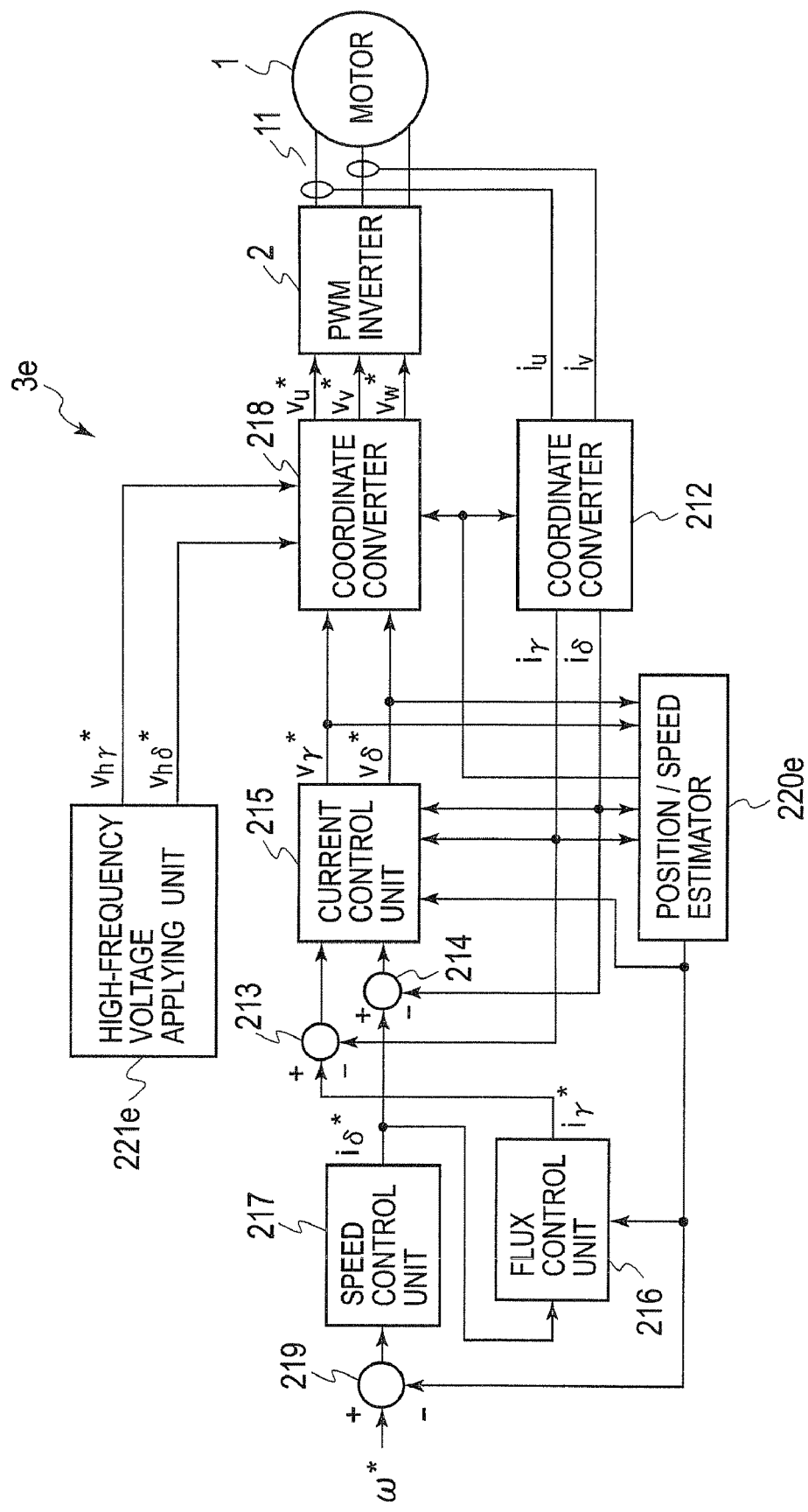
FIG. 25 is a block diagram of the motor drive system according to a fifth embodiment of the present invention.

FIG. 25 is an internal block diagram of a motor drive system according to the fifth embodiment. The motor drive system of FIG. 25 includes the motor 1 and the inverter 2 of FIG. 1, as well as a motor control device 3e and a phase current sensor 11. The motor control device 3e may be utilized as the motor control device 3 of FIG. 1. The motor control device 3e includes each unit referred to by reference numbers 212 to 219, 220e, and 221e. It also may be considered that the phase current sensor 11 is included in the motor control device 3e. Each unit within the motor control device 3e can utilize freely each value generated within the motor control device 3e. Operations of each unit referred to by the reference numbers 212 to 219 contained in the motor control device 3e are the same as that of the motor control device 3d of FIG. 23. However, it is not necessary to compute the current values iα and iβ at the coordinate converter 212 within the motor control device 3e.

The motor drive system of FIG. 25 also carries out the processes of steps S1, S2, and S3 of FIG. 22 sequentially. However, it is also possible to omit the process of step S2.

When a command signal to start rotation of the motor 1 is inputted to the motor drive system of FIG. 25, the motor control device 3e carries out a process to estimate the initial magnetic pole position at step S1. At step S1 (and S2), the high frequency voltage applying unit 221e applies the superposed voltage to motor 1 by generating command values $v_h\gamma^*$ and $v_h d^*$ defined by the above equation (A-1).

At step S1, it is not necessary that the d-axis coincide with the γ-axis. At step S1, the motor control device 3e sets an arbitrary axis to be the γ-axis. The phase θγ of the γ-axis that is set at step S1 is represented particularly by $\theta\gamma_0$. Since the motor control device 3e itself defines the γ-axis, the phase $\theta\gamma_0$ is known by the motor control device 3e. At step S1, operations of each unit referred to by the reference numbers 213 to 217 and 219 are stopped. As such, since a PLL control is not performed during the process of step S1, the phase θγ of the γ-axis remains stationary (that is, it is maintained in a constant value $\theta\gamma_0$).

Figure 26:
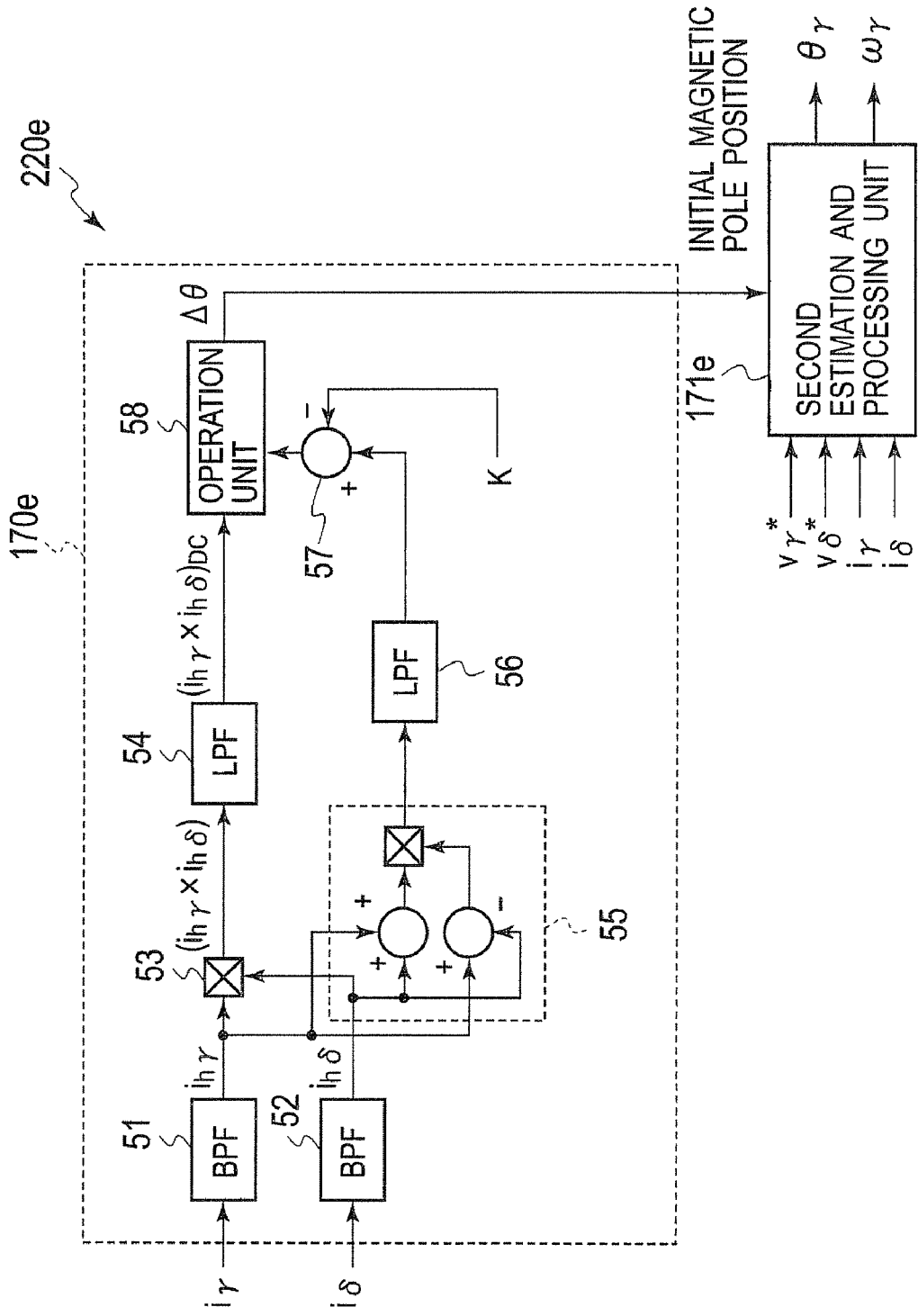
FIG. 26 is a block diagram of the position/speed estimator of FIG. 25.

FIG. 26 shows a block diagram of the position/speed estimator 220e. The position/speed estimator 220e includes the estimation processing unit 170e and the second estimation processing unit 171e. The estimation processing unit 170e includes each unit referred to by the reference numbers 51 to 58, which are the same as that of FIG. 14.

To be more precise, the following process is carried out at step S1 by which the initial magnetic pole position is estimated. At step S1, the coordinate converter 218 computes three-phase voltage command values by coordinate converting the command values $v_h\gamma^*$ and $v_h d^*$ on the γδ-axes generated by the high frequency voltage applying unit 221e onto the three-phase fixed coordinate axes based on the phase $\theta\gamma_0$. The motor current $I_a$ according to these three-phase voltage command values are supplied from the inverter 2 to the motor 1. The coordinate converter 212 computes the current values iγ and id by coordinate converting the current values $i_u$ and $i_v$ detected at the phase current sensor 11 at the time when the superposed voltage is applied to the current values on the γδ-axes based on the phase $\theta\gamma_0$, and gives the computed current values iγ and id to the estimation processing unit 170e. Thus, the axial error axial error Δθ at step S1 is computed from the operation unit 58 within the estimation processing unit 170e. Addition of the phase $\theta\gamma_0$ to the axial error Δθ computed at this step S1 coincides with the phase $\theta_d$ at step S1 (see FIG. 2A). Therefore, the position/speed estimator 220e estimates the addition the phase $\theta\gamma_0$ to the axial error Δθ computed at this step S1 as the initial magnetic pole position $\theta_d$.

After the initial magnetic pole position is estimated at step S1, the motor control device 3e starts the motor 1 by carrying out the process of step S2. At step S2, the process makes the second estimation processing unit 171e to estimate the γ-axis phase θγ and rotation speed ωγ and makes each unit referred to by the reference numbers 212 to 219 within the motor control device 3e to perform operations similar to that of each unit referred to by the reference numbers 12 to 19 of FIG. 13. The second estimation processing unit 171e utilizes the initial magnetic pole position $\theta_d$ estimated at step S1 as the phase θγ at the time of starting the process of step S2. Therefore, estimation of the magnetic pole position can be started from the state in which the axial error Δθ is zero.

The second estimation processing unit 171e is similar to the second estimation processing unit 171 of FIG. 24, and the estimation processes of the magnetic pole position at steps S2 and S3 are carried out according to the method shown in the fourth embodiment. Vector controls at steps S2 and S3 are performed based on these estimation results. As described above, the process of step S2 may be omitted. In addition, if the phase $\theta\gamma_0$ is set as zero, since the γδ-axes coincide with the αβ axes, the motor drive system as shown in FIG. 25 is equivalent to that of FIG. 23.

Sixth Embodiment

Now a sixth embodiment will be explained. In the fourth and fifth embodiments, a vector control of the motor 1 is performed by estimating the magnetic pole position at steps S2 and S3 based on the initial magnetic pole position, after the initial magnetic pole position is estimated at the process of step S1. However, a synchronized operation (V/f control) based on the initial magnetic pole position may be performed after the initial magnetic pole position is estimated at the process of step S1. During the execution of the synchronized operation, application of the superposed voltage to the motor 1 is stopped.

Figure 27:
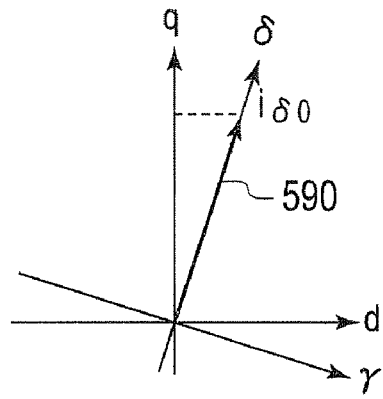
FIG. 27 is a diagram concerning a sixth embodiment of the present invention showing a current vector on a rotating coordinate system at the time of performing a synchronized operation.

In the synchronized operation, a control to converge the axial error $\Delta\theta$ to zero is not performed, and the axial error $\Delta\theta$ is widely variable according to for example the rotation speed command value $\omega^*$. During the execution of the synchronized operation, the rotation speed $\omega\gamma$ of the motor 1 is made to coincide with the rotation speed command value $\omega^*$. A current vector on the rotation coordinate system at the time of the synchronized operation is shown as a vector 590 in FIG. 27. The current vector here is a vectorial representation of the motor current $I_a$. Also, $i\gamma^*=0$ and $id^*=id_0$. In this case, the direction of the current vector is parallel to the d-axis and its amplitude is $id_0$. During the execution of the synchronized operation, the d-axis is delayed with respect to the q-axis so that torque generated by this current vector and the load torque are balanced out.

Now, a principle of the synchronized operation will be further explained. In particular, a current vector having constant vector amplitude is considered. When the load torque is smaller than the maximum torque that can be generated by this current vector, an operation is carried out in a state that the d-axis is delayed with respect to the q-axis so that torque generated by this current vector and the load torque are balanced out (it steps out of synchronization in a case when the load torque is larger than the maximum torque).

(1) And the more the current vector is delayed from the q-axis, the more the positive d-axis current is increased, whereas the q-axis current is decreased, and thus, the generated torque is decreased.

(2) Also, in a case that the generated torque is larger than the load torque, the rotation speed of the motor 1 is increased and the delay of the d-axis with respect to the q-axis moves in the direction of increase and the generated torque is decreased.

(3) On the other hand, in a case that the generated torque is smaller than the load torque, the rotation speed of the motor 1 is decreased and the delay of the d-axis with respect to the q-axis moves in the direction of decrease and the generated torque is increased.

According to these operations, an operation is performed in a state that the phase difference (axial error between the q-axis and the d-axis) is formed in which the load torque and the generated torque are balanced out. Such an operation is a synchronized operation.

When the synchronized operation is performed in a state that the initial magnetic pole position is not known, starting of the motor 1 varies every time depending on the initial magnetic pole position. By estimating the initial magnetic pole position and starting the motor 1 by the synchronized operation upon consideration of that initial magnetic pole position, it becomes possible to start the motor 1 without depending on the initial magnetic pole position. At the synchronized operation, application of the high frequency superposed voltage is unnecessary. Therefore, by starting the motor 1 according to the synchronized operation after the estimation of the initial magnetic pole position, it becomes possible to shorten the time period of noise originated from the application of the high frequency superposed voltage compared with a system that requires application of the high frequency superposed voltage even after the estimation of the initial magnetic pole position. As the estimation process of the initial magnetic pole position at step S1, an estimation process using the estimation processing unit 50 of FIG. 14 or the estimation processing unit 70 of FIG. 17 (estimation process using the PLL control) may be utilized. However, if the estimation process using the estimation processing unit 170 of FIG. 24 or the estimation processing unit 170*e* of FIG. 26 (direct estimation process of the magnetic pole position without using the PLL control) is utilized instead, the time period of an occurrence of noise originated from the application of the high frequency superposed voltage is distinctly shortened.

In the fourth embodiment, it was described that after the estimation of the initial magnetic pole position at step S1, estimation of the magnetic pole position based on the induced voltage at step S3 may be commenced directly without the process of step S2. In such a case, the same thing as described with respect to the synchronized operation applies.

When trying to start the motor 1 based on an induced voltage in a state that the initial magnetic pole position is not known, starting of the motor 1 varies every time depending on the initial magnetic pole position. By estimating the initial magnetic pole position, and then estimating the magnetic pole position based on the induced voltage upon consideration of that initial magnetic pole position, and starting the motor 1 by that estimation result, it becomes possible to start the motor 1 without depending on the initial magnetic pole position. At the estimation of the magnetic pole position based on the induced voltage, application of the high frequency superposed voltage is unnecessary. Therefore, by starting the motor 1 according to the estimation of the magnetic pole position based on the induced voltage after the estimation of the initial magnetic pole position, it becomes possible to shorten the time period of an occurrence of noise originated from the application of the high frequency superposed voltage compared with a system that requires application of the high frequency superposed voltage even after the estimation of the initial magnetic pole position. If the estimation process using the estimation processing unit 170 of FIG. 24 or the estimation processing unit 170*e* of FIG. 26 (direct estimation process of the magnetic pole position without using the PLL control) is utilized, the time period of an occurrence of noise originated from the application of the high frequency superposed voltage is distinctly shortened.

The magnetic pole position estimation method based on the induced voltage is a kind of magnetic pole position estimation method for high-speed rotation that is suitable especially at the time of high-speed rotation. There generally exists a system to start the motor 1 by the synchronized operation or the magnetic pole position estimation method for high-speed rotation without estimating the initial magnetic pole position. However, in such a system, there is an instance in which start of the motor fails depending on the initial magnetic pole position. As described above, reliable motor start can be realized by estimating the initial magnetic pole position and then upon consideration of the estimated result starting the motor.

Seventh Embodiment

The above explanation assumes that the motor 1 is for example an interior permanent magnet synchronous motor having a structural salient magnetic polar character. However, the technical contents as described above may be applied to a surface permanent magnet synchronous motor (hereinafter referred to as "SPMSM"), which is a non-salient pole machine. That is, the SPMSM may be adopted as the motor 1.

However, in this case, it is good to make the SPMSM motor 1 to have a salient magnetic polar character by producing magnetic saturation. In particular, it is better to intentionally cause the magnetic saturation in the motor 1 by increasing the amplitude $V_h\gamma$ of the superposed current in the γ-axis direction thus increasing the γ-axis component ($i_h\gamma$) of the superposed current. Since the d-axis inductance $L_d$ decreases when the magnetic saturation occurs, the superposed current becomes susceptible to flow in the d-axis direction. That is, since the SPMSM behaves as if it has a salient magnetic polar character, an estimation process similar to the case in which the motor 1 is a salient pole machine becomes possible.

It is also possible to utilize a synchronous reluctance motor having a salient magnetic polar character as the motor 1. The synchronous reluctance motor as the motor 1 includes a rotor and a stator having U, V, and W phase armature winding, but the rotor is not provided with a permanent magnet, and the rotor is rotated utilizing only the reluctance torque by a salient polar character of an iron core that forms the rotor (or an iron core that forms the rotor and the stator). However, it is also possible to provide a permanent magnet to the rotor of the synchronous reluctance motor as the motor 1 for creating field.

The rotor is formed such that a direction in which a magnetic flux is susceptible to flow (a direction in which a magnetic resistance is relatively small) and a direction in which a magnetic flux is hard to flow (a direction in which a magnetic resistance is relatively large) exist in the rotor of the synchronous reluctance motor as the motor 1. The axes along the former and the latter respectively correspond to the d-axis and the q-axis of the synchronous reluctance motor as the motor 1. Similarly to the permanent magnet synchronous motor, the d-axis and the q-axis at the synchronous reluctance motor are mutually orthogonal in a rotating coordinate system expressed in electric angle.

Eighth Embodiment

The motor drive system of the invention as described above is applicable in various electrical equipment which operates by utilizing torque of a motor within the motor drive system.

Figure 28:
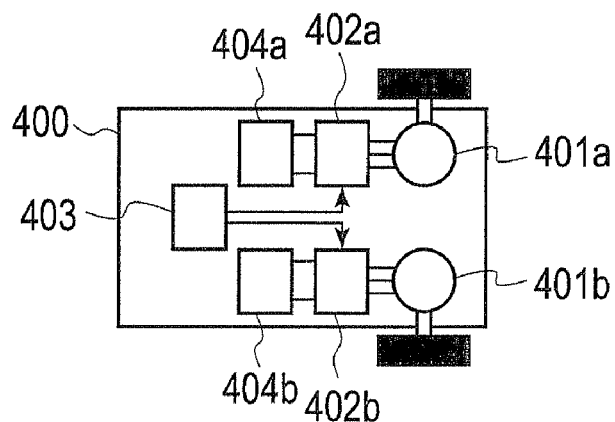
FIG. 28 is a block diagram of an electric vehicle according to an eighth embodiment of the present invention.

FIG. 28 is a block diagram of an electric vehicle 400 in which the motor drive system of the invention is mounted. Motors 401a and 401b, inverters 402a and 402b, a control device 403, and batteries 402a and 402b composed of secondary batteries are mounted in the electric vehicle 400, and the electric vehicle 400 runs by rotating the wheels of the electric vehicle 400 by utilizing the torque of the motors 401a and 401b.

Each of the motors 401a and 401b is the same as the motor 1, and each of the inverters 402a and 402b are the same as the inverter 2. A motor control device for the motor 401a and a motor control device for the motor 401b are intrinsic in the control device 403, and each motor control device within the control device 403 is the same as the motor control device 3. The control device 403 generates three-phase voltage command values for the inverter 402a based on the motor current $I_a$ that flows in the motor 401a, and generates three-phase voltage command values for the inverter 402b based on the motor current $I_a$ that flows in the motor 401b.

The inverter 402a converts a direct current voltage outputted by the battery 404a to three-phase alternate current voltages based on the three-phase voltage command values for the inverter 402a, and drives the motor 401a by applying the three-phase alternate current voltages to the motor 401a. Similarly, the inverter 402b converts a direct current voltage outputted by the battery 404b to three-phase alternate current voltages based on the three-phase voltage command values for the inverter 402b, and drives the motor 401b by applying the three-phase alternate current voltages to the motor 401b.

Figure 29A:
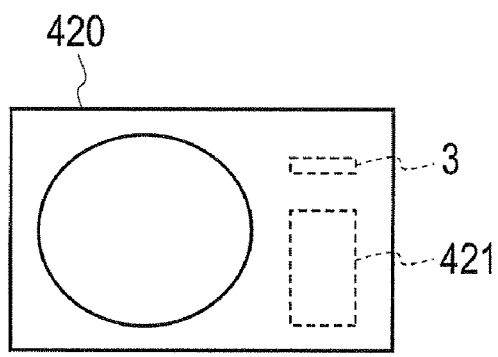
FIG. 29A is an outline view of an air conditioning machine according to the eighth embodiment of the present invention and FIG. 29B is an outline view of a compressor provided in the air conditioning machine.
Figure 29B:
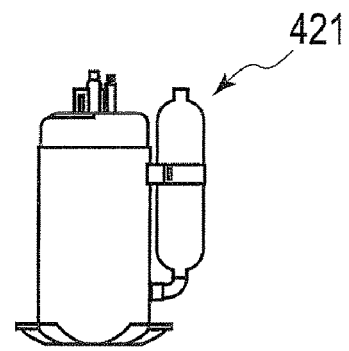

FIG. 29A is an outline view of an air conditioning machine 420 in which the motor drive system of the invention is mounted. The air conditioning machine 420 is a so-called outdoor machine of an air conditioner. The air conditioning machine 420 is provided with a compressor 421, as well as a motor drive system composed of the motor 2, the inverter 2, and the motor control device 3. The motor 1 and the inverter 2 (or just the motor 1) are built into the compressor 421. FIG. 29B is an outline view of the compressor 421. The air within a subject room is adjusted by the compressor 421 performing compression of the refrigerant gas (not shown) by using torque of the motor 1 as its driving source.

While the electric vehicle and the air conditioner were illustrated by an example as the electric equipment to which the motor drive system of the invention is applied, but such as a washing machine and a drying machine can be named as other electric equipment to which the motor drive system of the invention can be applied.

As described above, according to the magnetic pole position estimation method of the invention, not only sine function information but also cosine function information is utilized, and therefore, the estimated axis (the γ-axis) and the axis corresponding to the magnetic pole position do not necessarily need to coincide, and a magnetic pole position can be estimated accurately in a short time even in a case that the axial error between these axes is relatively large. After the initial magnetic pole position is estimated by the magnetic pole position estimation method of the invention, it is possible to shorten the time period of an occurrence of noise originated from the application of the high frequency superposed voltage by switching the magnetic pole position estimation method to one that does not require applying a high frequency superposed voltage. Once the initial magnetic pole position is estimated, stable motor initiation can be achieved by starting the motor upon consideration of the estimated result. Moreover, by shortening estimation time of the initial magnetic pole position, time required for initiation of the motor also can be shortened. As a result, especially with an electric vehicle, sense of discomfort due to the initiation time delay can be alleviated.

<<Modifications>>

Specific numerical values shown in the explanations above are illustrated merely as an example, and naturally they can be changed to various numerical values. The following notes 1 to 4 are provided as modifications of the above-described embodiments or explanatory notes. The contents described in each of the notes can be combined arbitrarily as long as they are not contradictory.

[Note 1]

In each of the embodiment described above, the phase current sensor 11 is used to detect the U-phase current value iu and the v-phase current value iv directly. However, they can be detected by the one-shunt current detection method which also was described above.

[Note 2]

A derivation method of all the values to be derived including the various command values (such as iγ*, id*, vγ*, and vd*) and state quantities (such as iγ and id) as described above is arbitrary. For example, they may be derived by operations within the motor control device (3, 3a, 3b, 3c, 3d, or 3e) or they may be derived from table data that are previously set.

[Note 3]

A part or all of the functions of the motor control device (3, 3a, 3b, 3c, 3d, or 3e) are achieved for example by using software (program) built in such as a general microcomputer. When the motor control device is achieved by using the software, the block diagram showing the configuration of each unit of the motor control device indicates a functional block diagram. Naturally, it is also possible to form the motor control device only with hardware rather than the software (program) or with a combination of the software and the hardware.

[Note 4]

In this specification and the drawings, the following point should be noted. In the description of the equations in the parenthesis (such as the equation (A-1)) and the drawings, the Greek alphabet letters (including γ, d, a, β) that are expressed as so-called subscript also can be expressed as standard letters that are not subscript. This difference between the subscript and standard letters of the Greek alphabets should be ignored. In other words, for example, $i_\gamma$ indicates the same thing as iγ, and $i_d$ indicates the same thing as id.

According to the invention, it becomes possible to provide a motor control device, a motor drive system, and electric equipment that contributes to shortening the time required for estimating the magnetic pole position (initial magnetic pole position).

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

What is claimed is:

1. A motor control device for controlling a motor based on an estimated magnetic pole position, comprising:
a voltage applying unit for applying a voltage for estimation having a predetermined frequency to a motor;
a current detection unit for detecting a current that flows in the motor; and
a magnetic pole position estimation unit for estimating a magnetic pole position in a rotor of the motor based on a current detected by the current detection unit;
wherein the magnetic pole position estimation unit includes an estimation processing unit for deriving a first axis component, a second axis component, a third axis component, and a fourth axis component of a current for estimation that flows in the motor due to application of the voltage for estimation from a first axis component and a second axis component of the current detected by the current detection unit, and estimating the magnetic pole position based on the first to the fourth axis components of the current for estimation, and
wherein in an electric angle expression, the first axis and the second axis are mutually orthogonal and the third axis and the fourth axis are mutually orthogonal, and each of the third axis and the fourth axis differs from the first axis.

2. The motor control device of claim 1, wherein the third axis and the fourth axis are shifted by p/4 in electric angle from the first axis and the second axis.

3. The motor control device of claim 1, wherein the estimation processing unit is configured to derive the first axis component and the second axis component of the current for estimation by extracting a predetermined frequency component from the first axis component and the second axis component of the current detected by the current detection unit, and derive the third axis component and the fourth axis component of the current for estimation by utilizing a sum and a difference of the first axis component and the second axis component of the current for estimation.

4. The motor control device of claim 1, wherein the estimation processing unit is configured to estimate the magnetic pole position based on a product of the first axis component and the second axis component of the current for estimation, and a product of the third axis component and the fourth axis component of the current for estimation.

5. The motor control device of claim 4, wherein the estimation processing unit is configured to estimate the magnetic pole position based on a direct current component of the product of the first axis component and the second axis component of the current for estimation, and a direct current component of the product of the third axis component and the fourth axis component of the current for estimation.

6. The motor control device of claim 5, wherein the estimation processing unit is configured to estimate the magnetic pole position by dividing the direct current component of the product of the first axis component and the second axis component of the current for estimation by a value including the direct current component of the product of the third axis component and the fourth axis component of the current for estimation.

7. The motor control device of claim 4, wherein the estimation processing unit is configured to derive the product of the third axis component and the fourth axis component of the current for estimation by utilizing square information of each of the first axis component and the second axis component of the current for estimation.

8. The motor control device of claim 1, wherein the first axis is an estimated axis for control corresponding to the d-axis of the rotor.

9. The motor control device of claim 1, wherein the first axis is a predetermined fixed axis.

10. A motor drive system, comprising:
a motor;
an inverter for driving the motor; and
the motor control device of claim 1 that controls the motor by controlling the inverter.

11. An electric equipment that operates by utilizing torque of the motor provided in the motor drive system of claim 10.

* * * * *